United States Patent
Hay et al.

(10) Patent No.: US 7,696,298 B2
(45) Date of Patent: Apr. 13, 2010

(54) POLY(ARYLENEBENZIMIDAZOLE) POLYMERS AND COPOLYMERS

(76) Inventors: Allan S. Hay, 5015 Glencalm Avenue, Montréal, Québec (CA) H3W 2B3; Sumiko Matsumura, 3469 Rue De Bullion, Apartment 7, Montréal, Québec (CA) H2X 3A1; Antisar R. Hlil, 2 John-Fisher Avenue, Pointe-Claire, Québec (CA) H9R 5W4

( * ) Notice: Subject to any disclaimer, the term of this patent is extended or adjusted under 35 U.S.C. 154(b) by 0 days.

(21) Appl. No.: 12/230,626

(22) Filed: Sep. 2, 2008

(65) Prior Publication Data

US 2009/0131623 A1     May 21, 2009

Related U.S. Application Data

(60) Provisional application No. 60/935,959, filed on Sep. 7, 2007.

(51) Int. Cl.
*C08G 65/40*     (2006.01)
*C08G 75/00*     (2006.01)

(52) U.S. Cl. .......................... 528/211; 429/33; 528/321; 528/327; 528/336

(58) Field of Classification Search ................... 429/33; 528/211, 321, 327, 336
See application file for complete search history.

(56) References Cited

U.S. PATENT DOCUMENTS

| | | | |
|---|---|---|---|
| 3,174,947 A | 3/1965 | Marvel et al. | |
| 3,708,439 A | 1/1973 | Sayigh et al. | |
| 5,237,062 A | 8/1993 | Hay | |
| 5,254,663 A | 10/1993 | Hay | |
| 5,410,012 A * | 4/1995 | Connell et al. | 528/125 |
| 5,412,059 A | 5/1995 | Connell et al. | |
| 5,554,715 A | 9/1996 | Connell et al. | |
| 5,637,670 A * | 6/1997 | Connell et al. | 528/183 |

* cited by examiner

*Primary Examiner*—Terressa M Boykin
(74) *Attorney, Agent, or Firm*—Ogilvy Renault LLP

(57) ABSTRACT

Polymers and copolymers of formula I:

(I)

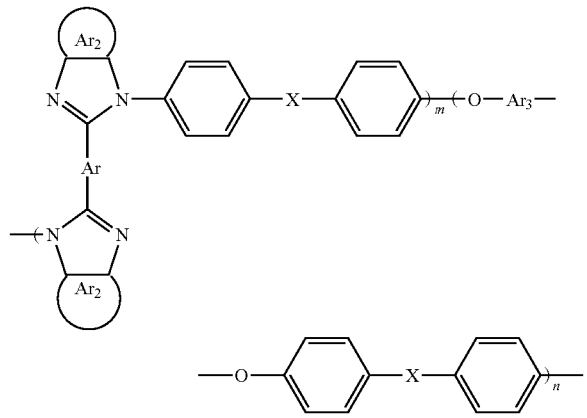

in which m is typically 30 to 500 and n is 0 to 500; Ar is for example, 1,2-phenylene, 1,3-phenylene, 1,4-phenylene, or 2,6-pyridylene; $Ar_2$ and $Ar_3$ are selected from various bivalent aryl and heteroaryl groups; and X is for example, the bivalent $SO_2$ or CO. have high temperature properties which make them useful as films, matrices in carbon fiber reinforced composites and high performance adhesives; processes for preparing the polymers and copolymers employ a novel C—N coupling reaction.

20 Claims, No Drawings

POLY(ARYLENEBENZIMIDAZOLE) POLYMERS AND COPOLYMERS

CROSS REFERENCE TO RELATED APPLICATION

This invention claims the benefit of U.S. Provisional application 60/935,959 filed Sep. 7, 2007.

FIELD OF INVENTION

Novel poly(arylenebenzimidazole) compounds, such as those derived from di(1H-benzo[d]imidazol-2-yl)arene and derivatives thereof, are obtainable from a novel C—N coupling reaction at elevated temperatures.

BACKGROUND OF THE INVENTION

Polybenzimidazoles (PBI) are among the most thermally stable polymers known.[1-5] As well as high temperature stability, the polymers have excellent flammability resistance and high chemical resistance. They are very expensive polymers but have found uses as a high performance fiber and as a film, foam, paper and in membranes for polymer electrolyte membrane fuel cells. The most common structure is synthesized by reaction of biphenyl-3,3',4,4'-tetraamine with isophthalic acid and these conversions have been carried out under a wide variety of conditions.[4]

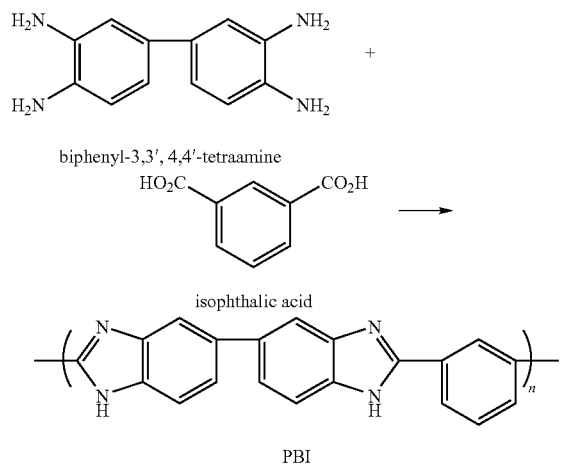

Poly (N-phenylbenzimidazoles)[6-8] have also been synthesized. They are more soluble and are reported to be more thermooxidatively stable than the parent PBI polymers since the NH group has been replaced by a phenyl group.

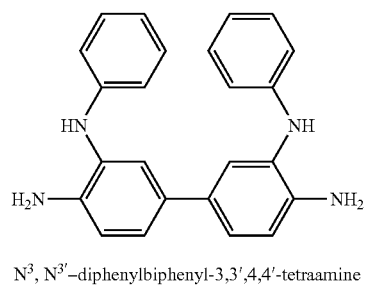

N³, N³'-diphenylbiphenyl-3,3',4,4'-tetraamine

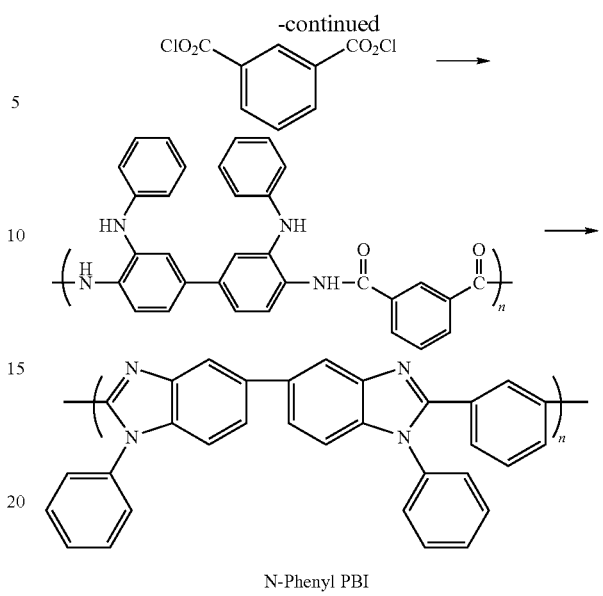

N-Phenyl PBI

Several years ago, the present inventors found that high molecular weight polymers could be prepared from 4-(4-hydroxyphenyl)phthalazin-1(2H)-one by reaction with activated halides.[9,10] The N—C coupling reaction was unexpected since the NH group behaves like a phenolic OH group in this reaction. These polymers are excellent high temperature thermoplastics and are currently being commercialized in China.

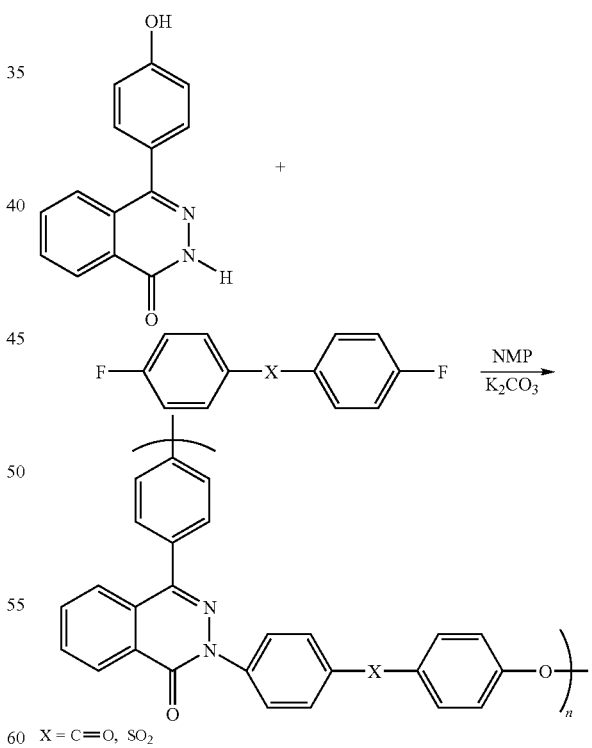

X = C=O, SO₂

The present inventors subsequently prepared bisphthalazinone structures from the monomers shown in Scheme 1[11], however, these polymers were very difficult to process because of crystallinity and very high glass transition temperatures. This problem was recently alleviated by the synthesis of the more flexible monomers shown in Scheme 2.[12,13]

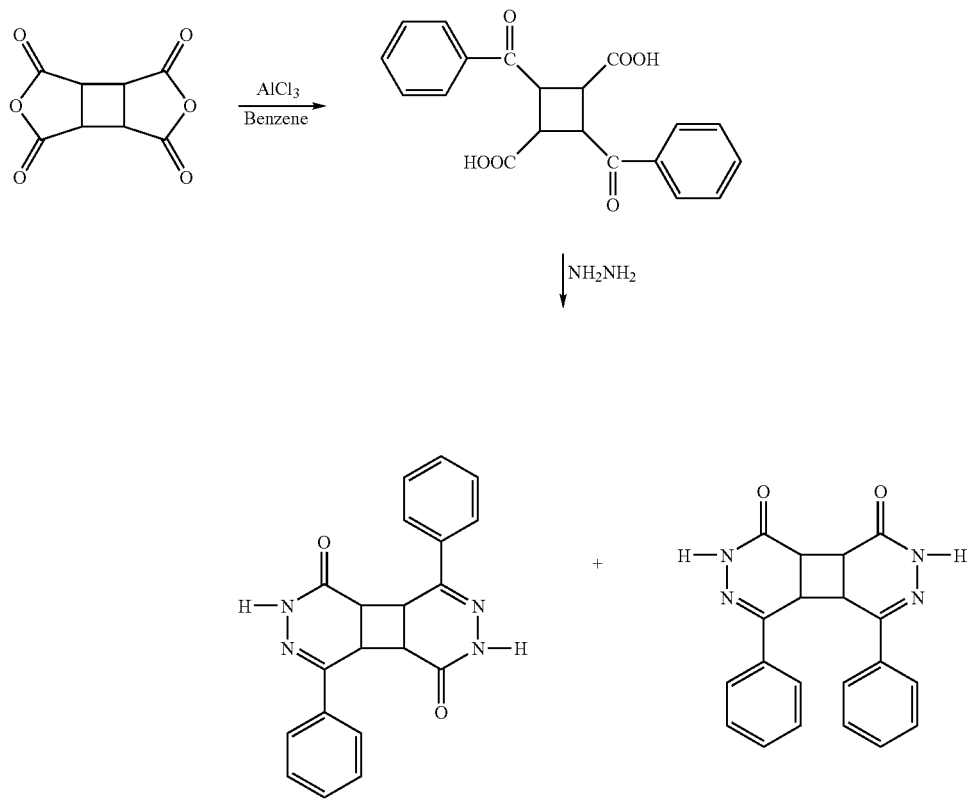
Scheme 1
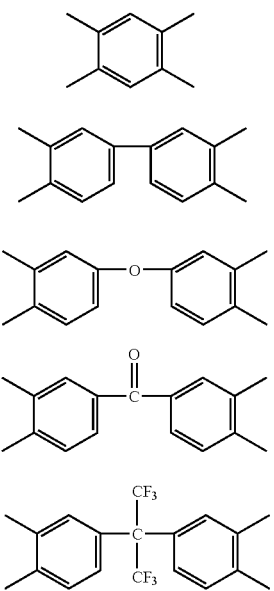
Ar

Scheme 2

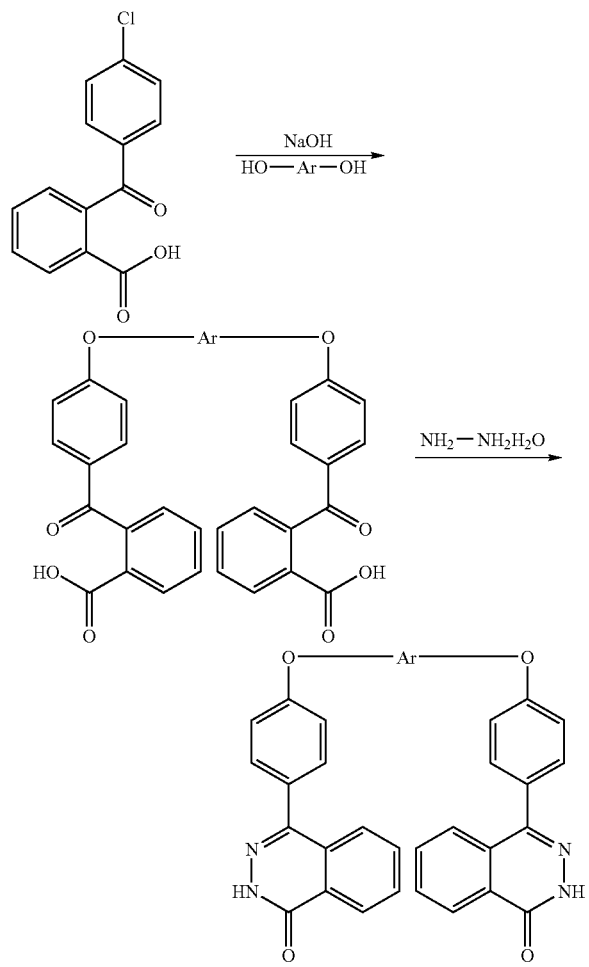

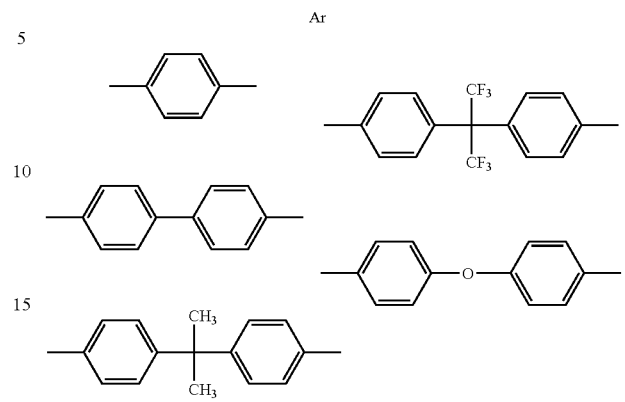

There has been a great deal of recent effort centered on Pd-catalyzed C—N coupling reactions of NH groups with unactivated halides,[26,27] as well as methods to improve the standard Ullmann-type, copper-catalyzed, reactions.[28,29] These reactions generally require the use of aryl bromides or iodides and quite high yields have been obtained. These reactions have not been reported for the formation of high molecular weight polymers.

In a series of papers and patents, Hergenrother and associates described the synthesis of high performance polymers, poly(aryl ether)benzimidazoles, by the reaction of bisphenols containing benzimidazole moieties with activated halides.[14-17] The synthesis, properties and potential applications of this class of polymers has been extensively reviewed.[18]

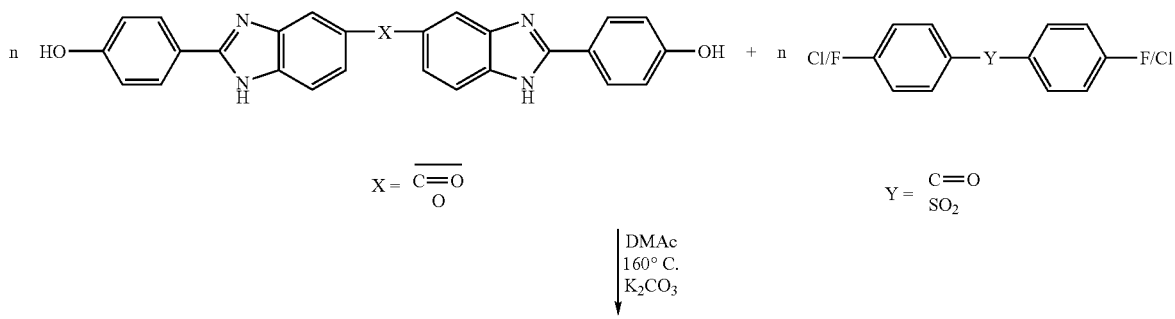

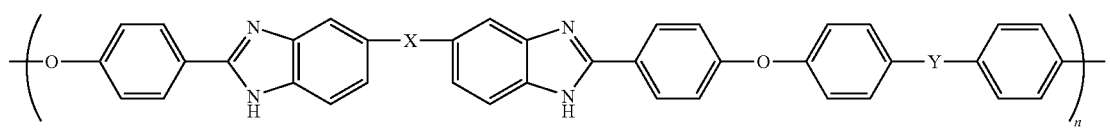

Connell found that isophthaloyl-containing poly(aryleneether benzimidazoles (PAFBI) exhibited high mechanical properties in the form of unoriented thin films and carbon fiber reinforced composites.[22]

Poly (arylene ether)s containing N-arylenebenzimidazole groups were also prepared by the aromatic nucleophilic displacement reaction of two new bis(hydroxyphenyl-N-arylenebenzimidazole)s with activated aromatic difluorides in sulfolane at 200° C. in the presence of anhydrous potassium carbonate.[14,15,19-24] The polymers exhibited glass transition temperatures ranging from 264 to 352° C. and inherent viscosities from 0.79 to 1.99 dl g−1 and had very good thermal stability.[5,14]

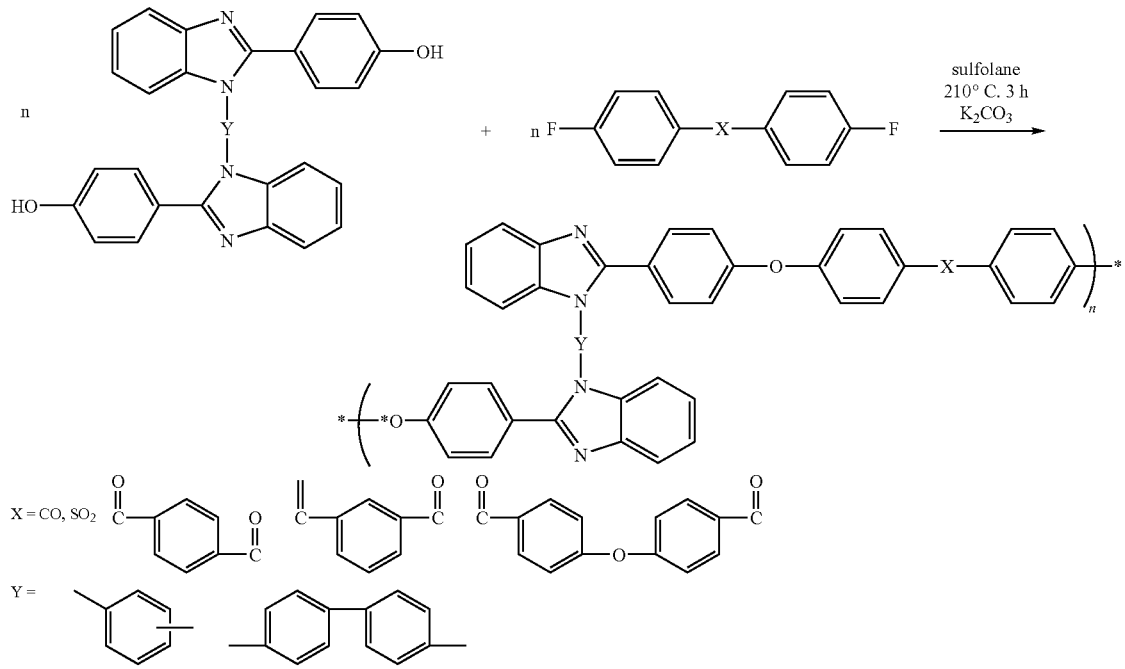

The polymers exhibited lower Tgs, tensile properties, and moisture uptake than poly(arylene ether benzimidazole)s, presumably due to the lack of hydrogen bonding. The preparation of these polymers, as illustrated in the example immediately below, is a very lengthy and expensive process and some of the intermediates are carcinogenic.[8]

Summary of the Invention

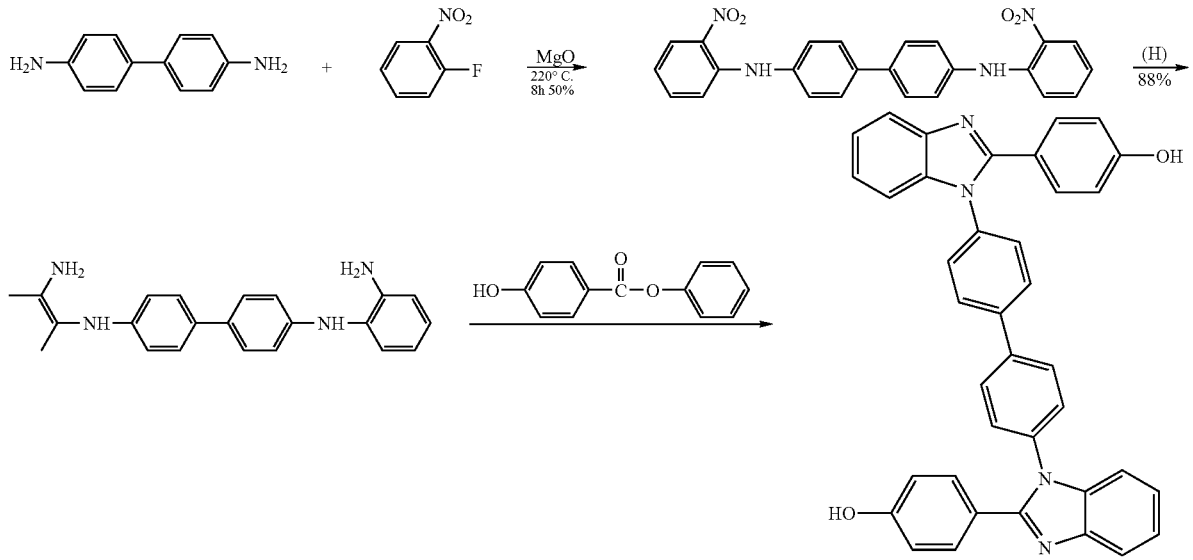

-continued

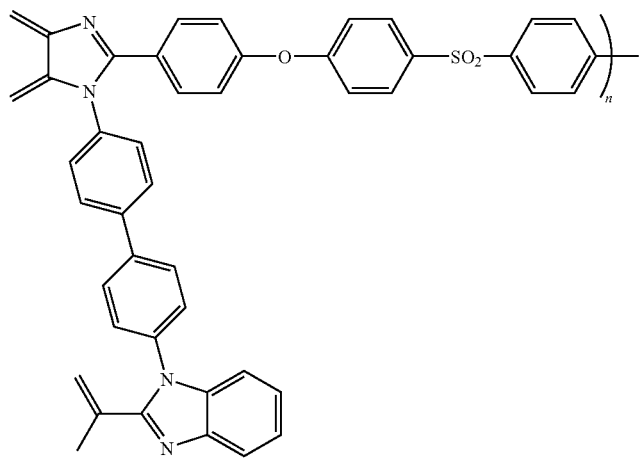

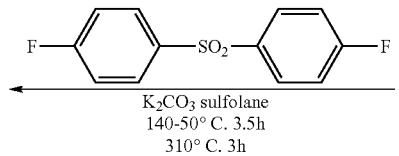

It is an object of this invention to provide novel polymers and copolymers.

It is another object of this invention to provide methods for the manufacture of the novel polymers and copolymers.

Novel polymers and copolymers of this invention have value resulting from their thermal stability and their ability to form films, including flexible films, by casting from solution, which films may be employed in a variety of applications, including high performance applications, for example as electrolyte membranes in fuel cells. In particular the excellent high temperature properties of the polymers and copolymers make them useful as films, matrices in carbon fiber reinforced composites and high performance adhesives.

A first aspect of the invention relates to novel polymers and copolymers thereof. The novel polymers are of the formula I -continued

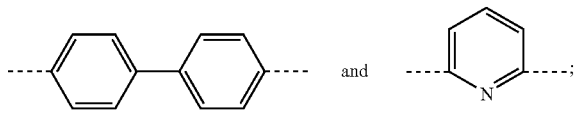

$Ar_2$ is a fused ring selected from the group consisting of:

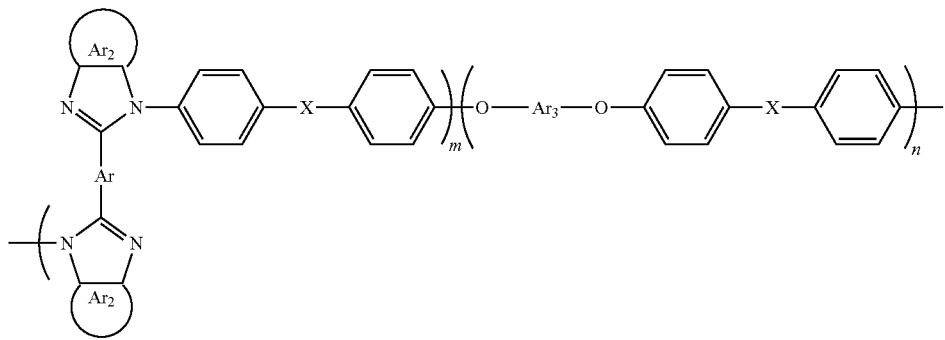

wherein Ar, $Ar_2$, $Ar_3$, and X are defined as follows:

Ar is a divalent radical selected from the group consisting of:

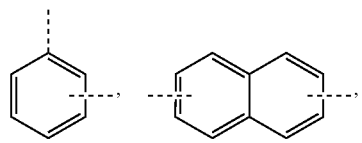

o-, m-, p-      1, 4-, 1, 5-, 2, 7-

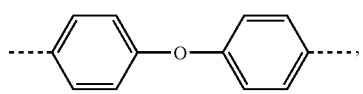

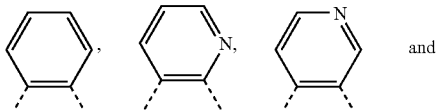

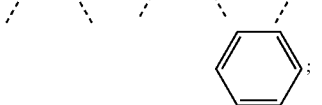

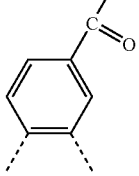

Ar₃ is a divalent radical selected from the group consisting of:

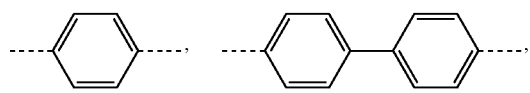

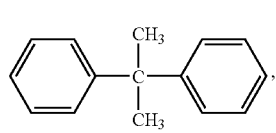

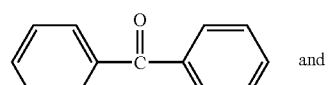

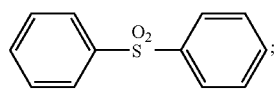

X is a divalent radical selected from the group consisting of:

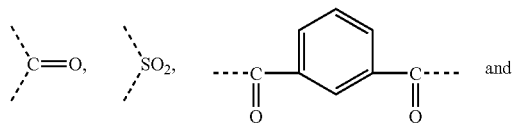

-continued

and (m+n) ranges from 1 to 10,000, preferably 1 to 1000, and more preferably 30 to 500, where m is an integer of at least 1, and preferably 30 to 500, and n is an integer from 0 to 9999, preferably 0 to 999, and more preferably 0 to 500.

In another aspect of the invention there is provide a process for preparing the novel polymers and copolymers by a novel carbon-nitrogen (C—N) coupling of benzimidazoles to activated halides at temperatures not below 160° C., ie a temperature of at least 160° C. The polymers are prepared by a process which comprises the reaction step at a temperature of no less than 160° C., ie. a temperature of at least 160° C., wherein Ar, Ar₂, X, m and n are as defined above, and Halogen is selected from F, Cl, Br and I, preferably F or Cl.

The copolymers are prepared by a process which comprises the reaction step

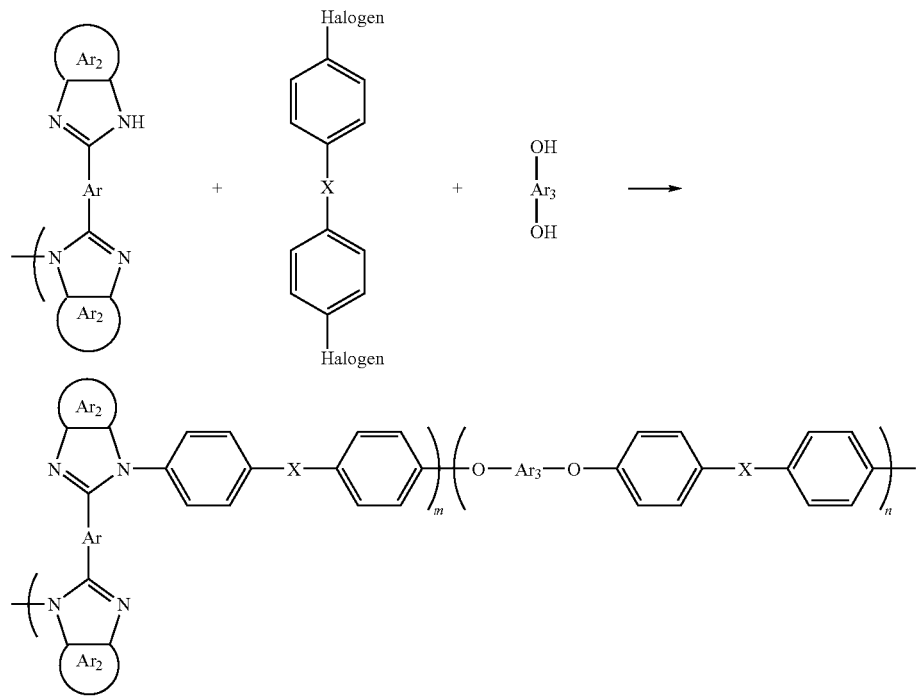

at a temperature of no less than 160° C., ie. a temperature of at least 160° C., wherein Ar, $Ar_2$, $Ar_3$, X, m and n are as defined above, and Halogen is selected from F, Cl, Br and I, preferably F or Cl.

DESCRIPTION OF THE INVENTION

In the preparation discussed supra in the Background of the Invention, of poly(arylene ether benzimidazole)s and poly(N-arylenebenzimidazole)s[21,22] both NH and OH groups are present in the monomers but only the OH reacts under the conditions used.

Surprisingly, it has now been found that, under similar conditions, but at higher temperatures, to those used for the preparation of poly(arylene ether benzimidazole)s and poly (N-arylenebenzimidazole)s, the NH group in benzimidazoles will undergo a C—N coupling reaction with activated halides to give novel polymers of high molecular weight, of the invention, as illustrated in the example below.

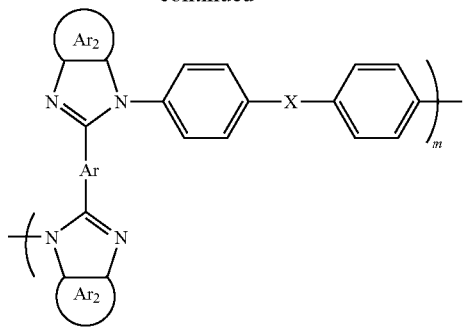
-continued at a temperature of no less than 160° C., as described above.

The process of this aspect of the invention is typically performed at a temperature of at least about 170° C. and typically at a temperature up to 320° C., such as at least about 180° C. or about 190° C., such as at about 200° C. or 210° C. Higher temperatures may be required depending on the halo-

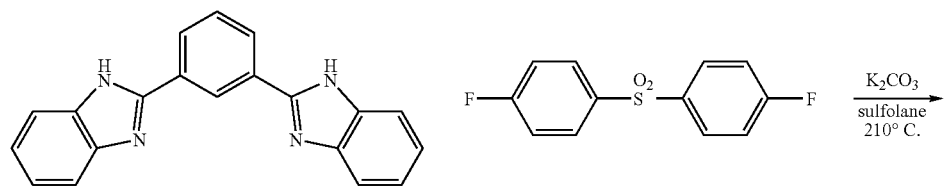

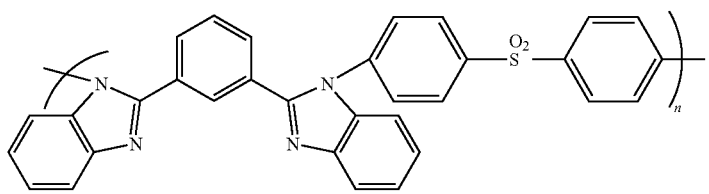

Accordingly, one aspect of the invention relates to a process which comprises the reaction step

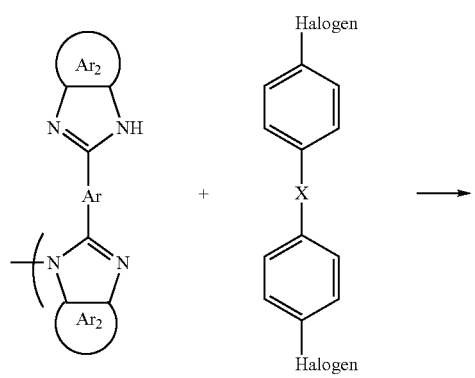

gen, in the starting compound, for example when the halogen is Cl, higher temperatures are typically required than for the corresponding reaction where the Halogen is F. The halogen may be selected from the group consisting of Br, Cl, I, and F, and more typically is selected from the group consisting of F and Cl.

Preferably, if X is $SO_2$ or CO, the halogen will be F, so as to avoid the higher temperatures required for other values of halogen, especially Cl. In the case where X is $SO_2$ or CO, and the Halogen is Cl, the reaction is typically carried out at a temperature of 250° C. to 320° C., in diphenylsulphone or benzophenone as solvent.

The process is suitably carried out in the presence of a base, such as $K_2CO_3$ and further typically comprises the use of a solvent such as sulfolane or other aprotic dipolar solvents, or diphenylsulphone or benzophenone. The size of the polymer synthesized, as known to the skilled person, may vary depending on stoichiometries and concentration. Suitably, in the process of this aspect of the invention, m is an integer between 1 and 10,000, and preferably 1 to 1000, and more preferably m is 30 to 500.

In general the properties of the polymer depend on the total chain length and in particular the end to end distance. The terminal groups of the polymer will typically be NH groups of the benzimidazole, or cyclics may form.

A further aspect of the invention relates to copolymers of the formula

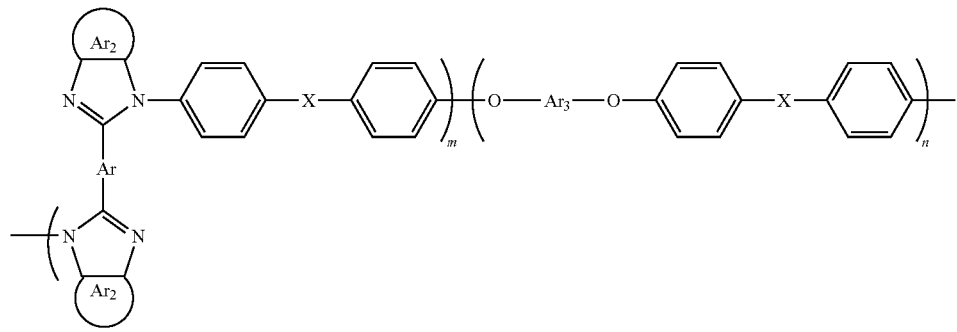

as described above.

A further aspect of the invention relates to a process which comprises the reaction step:

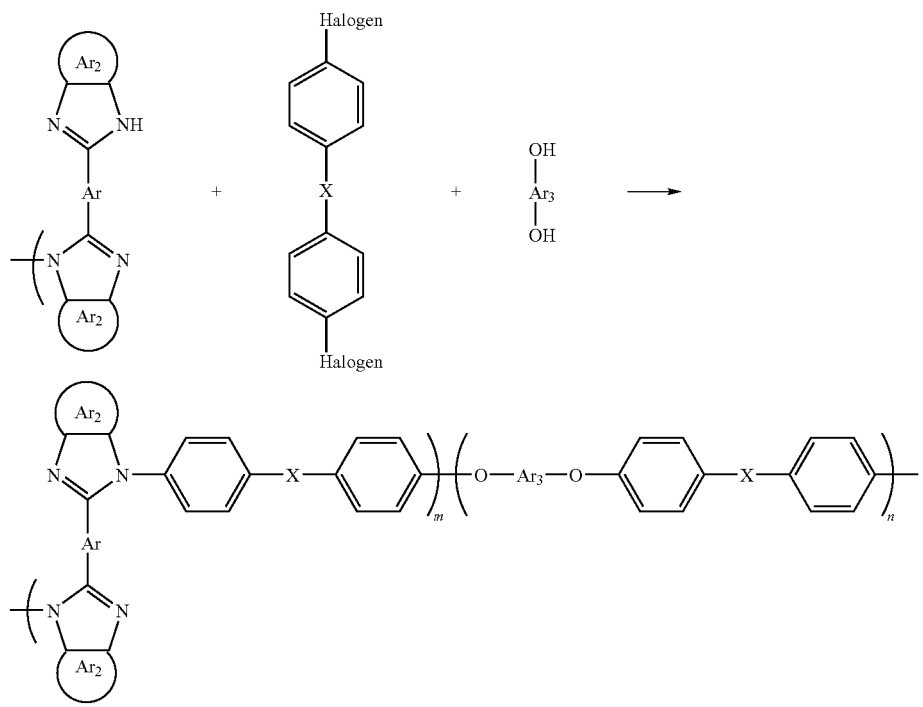

at a temperature of no less than 160° C., as described above.

The process of this latter aspect of the invention is typically performed at a temperature of at least about 170° C. and typically at a temperature up to 320° C., such as at least about 180° C. or about 190° C., such as at about 200° C. or 210° C. Higher temperatures may be required depending on the halogen, in the starting compound, for example when the halogen is Cl, higher temperatures are typically required than for the corresponding reaction where the Halogen is F. The halogen may be selected from the group consisting of Br, Cl, I, and F, and more typically selected from the group consisting of F and Cl.

Preferably, if X is $SO_2$ or CO, the Halogen will be F, so as to avoid the higher temperatures required for other values of Halogen, especially Cl. In the case where X is $SO_2$ or CO, and the halogen is Cl, the reaction is typically carried out at a temperature of 250° C. to 320° C., in diphenylsulphone or benzophenone as solvent.

The process is suitably carried out in the presence of a base, such as $K_2CO_3$ and further typically comprises the use of a solvent such as sulfolane or other aprotic dipolar solvents, or diphenylsulphone or benzophenone. The size of the polymer synthesized, as known to the skilled person, may vary depending on stoichiometries and concentration. Suitably, under the process of this aspect of the invention, (m+n) can range from 1 to 10,000 wherein m must be at least 1, preferably 1 to 1000, and more preferably m is 30 to 500, and n can vary from 1 to 9999, preferably 1 to 999, and more preferably 1 to 500.

In general the properties of the copolymer depend on the total chain length and in particular the end to end distance. The terminal groups of the polymer will typically be NH groups of the benzimidazole, or cyclics may form.

Advantageously, the polymers and copolymers of the present invention have very high Tgs and they are very thermally stable. The $T_{d-5\%}$ (5% weight loss in $N_2$) for the copolymer of example 7 below is 539° C., similar to the properties of polymers prepared by Hergenrother et al.

The molecule 4-(1H-benzo[d]imidazol-2-yl)phenol has been used as an end-cap in the synthesis of poly(arylene ether benzimidazole)s and poly(N-arylenebenzimidazole)s to control the molecular weight of the polymers.[17] In this reaction it is reported that it acts as a monofunctional compound, i.e. with only the OH group entering the reaction. In the present invention it has been found, surprisingly, that 4-(1H-benzo[d]imidazol-2-yl)phenol can behave as a bifunctional compound and that high molecular weight polymers (n=0) can be prepared by reaction with activated dihalides, as shown below. Copolymers can also be synthesized by copolymerization with bisphenols as shown below with 4,4'-biphenol.

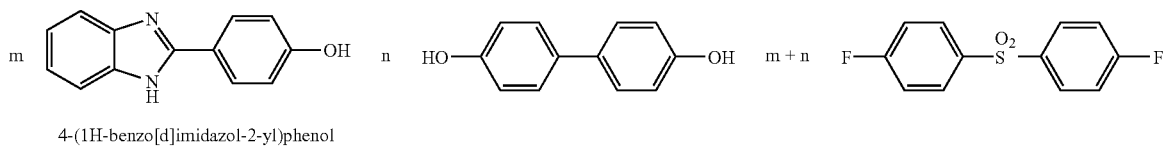

4-(1H-benzo[d]imidazol-2-yl)phenol

K$_2$CO$_3$
sulfolane
210° C.

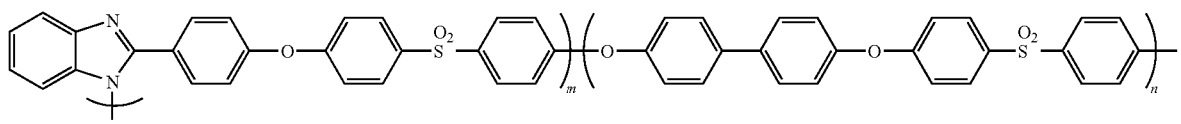

Accordingly a further aspect of the invention relates to copolymers of the formula

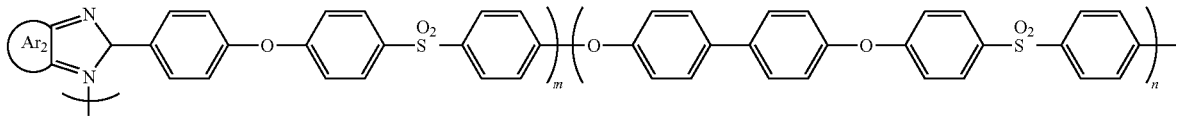

where Ar$_2$, m and n are as defined above.

High molecular weight copolymers are produced by copolymerizing the bisbenzimidazoles with bisphenols as shown in the example below with 4,4'-biphenol.

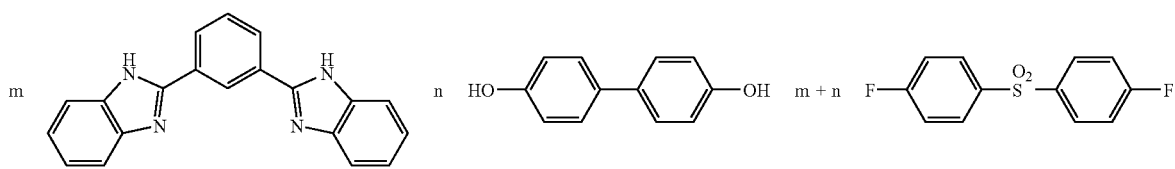

K$_2$CO$_3$
sulfolane
210° C.

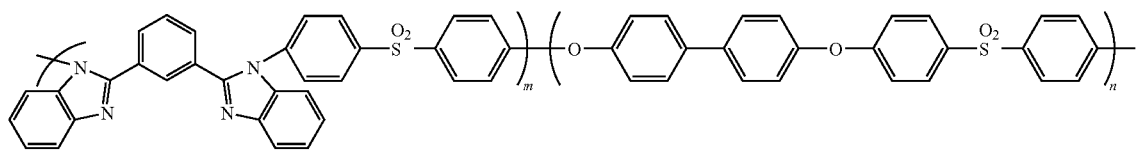

Copolymers with 2,6-bisbenzimidazolylpyridine are synthesized as follows:

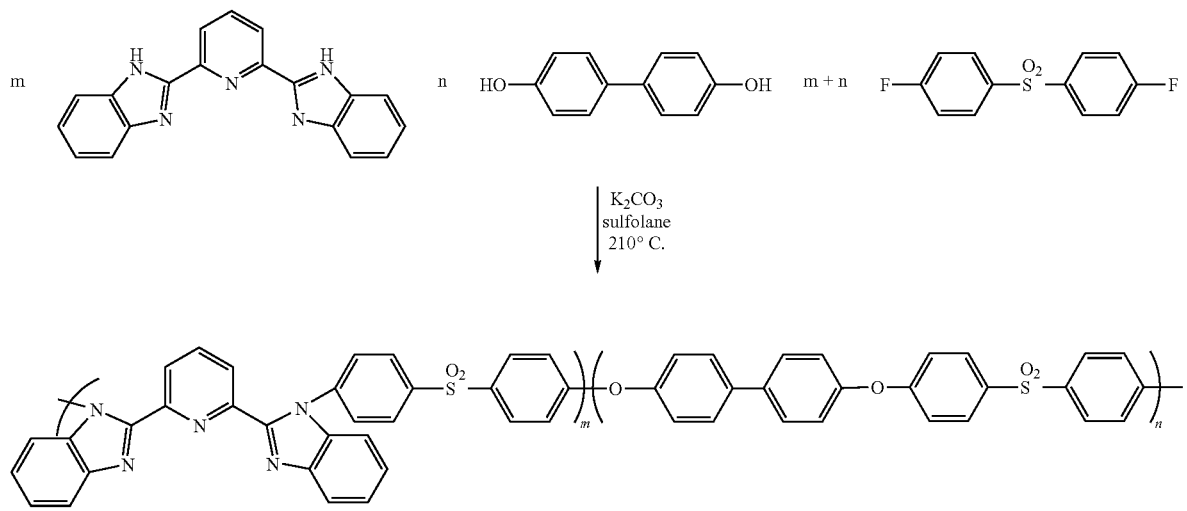

Accordingly, a further aspect of the invention relates to copolymers of the formula

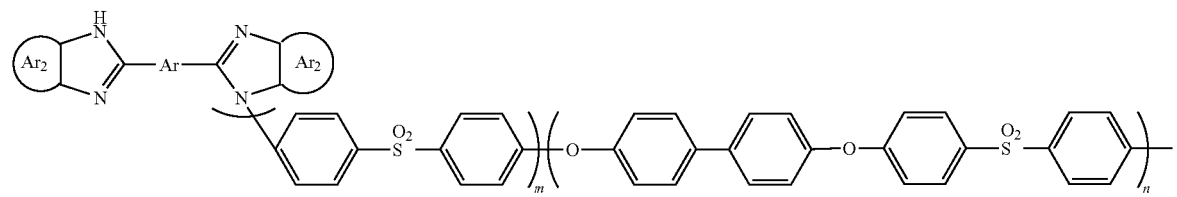

where Ar, $Ar_2$, m and n are as defined supra.

A further aspect of the invention relates to compounds obtainable by a process of the invention. In particular, an interesting aspect of the invention relates to polymers are of the formula I Formula I

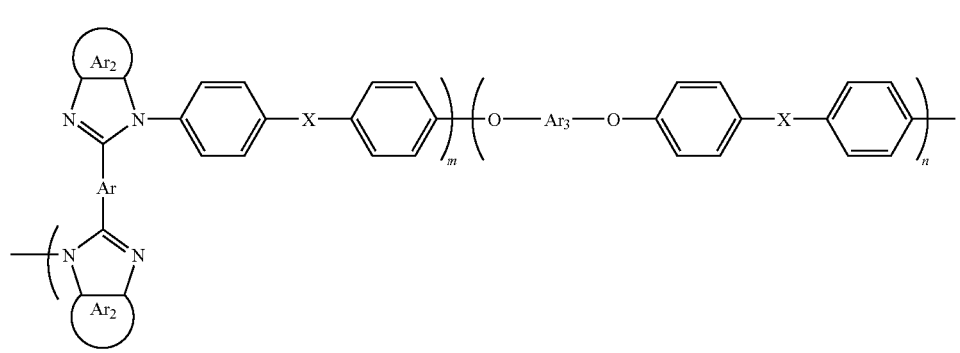

wherein in and n are as defined above and Ar, $Ar_2$, $Ar_3$, and X are defined as follows:

Ar is a divalent radical selected from the group consisting of:

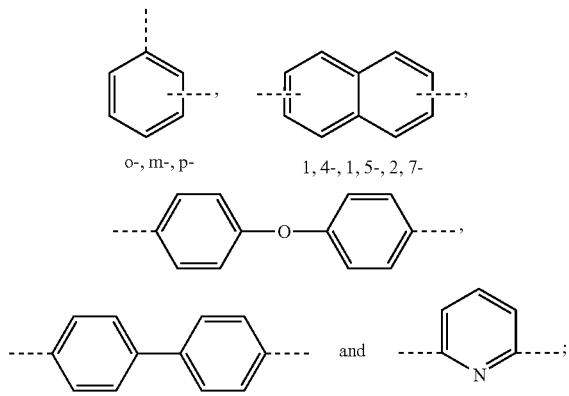

$Ar_2$ is a fused ring selected from the group consisting of:

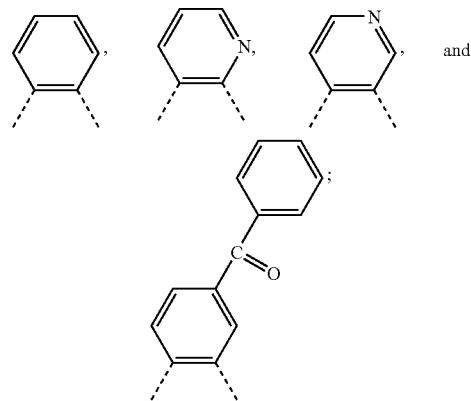

$Ar_3$ is a divalent radical selected from the group consisting of:

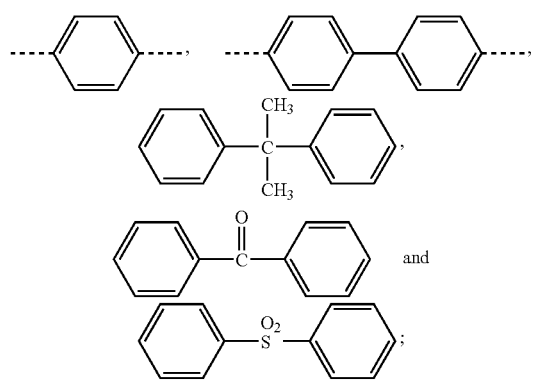

X is a divalent radical selected from the group consisting of:

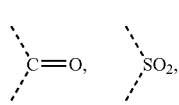

-continued

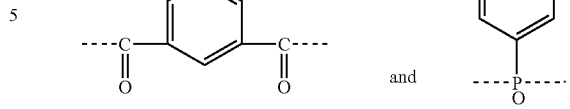

EXAMPLES

Characterization

Matrix assisted laser desorption ionization time-of-flight (MALDI-TOF) mass spectra were recorded on a Kratos Kompact MALDI-III TOF mass spectrometer with the instrument set in positive reflection mode to get higher resolution. The melting points were taken on a Fisher-Johns melting point apparatus. Ultraviolet-visible (UV-vis) absorption spectra were recorded on a CARY 50 spectrophotometer. Fluorescent spectra were taken on a Fluoro Max-2 spectrophotometer. Monitoring the progress of the reaction and purity of the isolated monomers was done by high performance liquid chromatography (HPLC, Milton Roy, CM 4000) with methanol as an eluent and a UV detector at 254 nm. The $T_g$s of the polymers were obtained using a Seiko 220 DSC at a heating rate of 20° C./min. The $T_g$ was taken from the midpoint of the change in slope of the baseline, while melting temperature were taken from the onset of the change in slope to a minimum of the endotherm of peak. The weight loss data were obtained from a Seiko 220 TGA/DTA instrument at a heating rate of 20° C./min in nitrogen. Inherent viscosity data were obtained with a calibrated Ostwald viscometer. A water bath with a Julabo (Model type PC) heater was employed to control the temperature.

Homopolymers

Example 1

Polymerization of 1,3-dibenzimidazolylbenzene with bis(4-fluorophenyl)sulfone

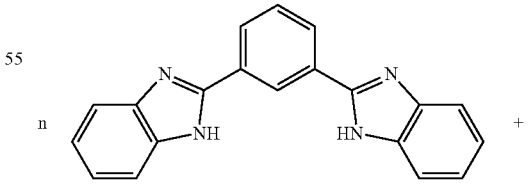

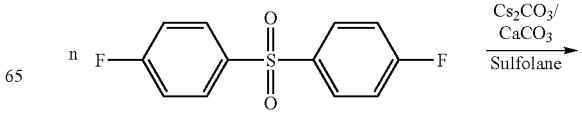

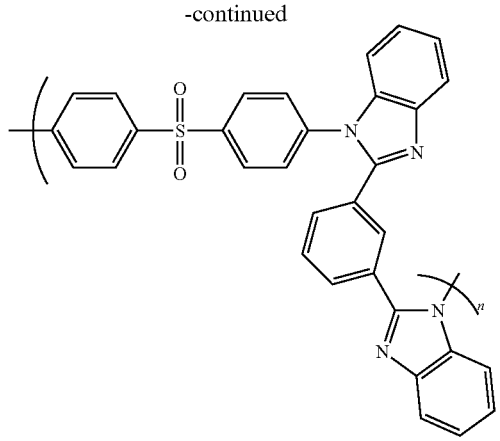

The following procedure is typical for the preparation of homopolymers.

A 25 mL three-necked round-bottom flask was equipped with an argon inlet, magnetic stirrer, a Dean-Stark trap and condenser. The flask was flushed with argon, and then charged with 1, 3-dibenzimidazolylbenzene (0.62 g, 2.0 mmol), bis(4-fluorophenyl)sulfone (0.51 g, 2.0 mmol), cesium carbonate (0.65 g, 2.0 mmol), calcium carbonate (0.20 g, 2.0 mmol), sulfolane (2.5 g), and chlorobenzene (3 mL). The mixture was heated to azeotrope off the resulting water with chlorobenzene. After chlorobenzene was removed, the reaction mixture was brought up to 210° C. for 2 h. Additional 1 mL of sulfolane was then added to dilute the solution and the reaction was kept at 210° C. for 6 h. When the color of the reaction system changed and the viscosity increased significantly, the reaction mixture was cooled down and diluted with 2 mL of solvent. The resulting solution was poured into 200 mL of methanol and 2 mL of acetic acid to precipitate out the polymer. The resulting polymer was partially soluble in chloroform or dichloromethane and was redissolved. The polymer solution was filtered through a thin layer of Celite (trademark) to remove inorganic materials, and the resulting polymer was precipitated out by pouring into methanol. The polymer was collected and dried in vacuo at 80° C. for 24 h. Yield 90%.

Co-Bisbenzimidazoles

Example 2

Copolymer of 1,3-dibenzimidazolylbenzene and 1,4-dibenzimidazolylbenzene 50/50

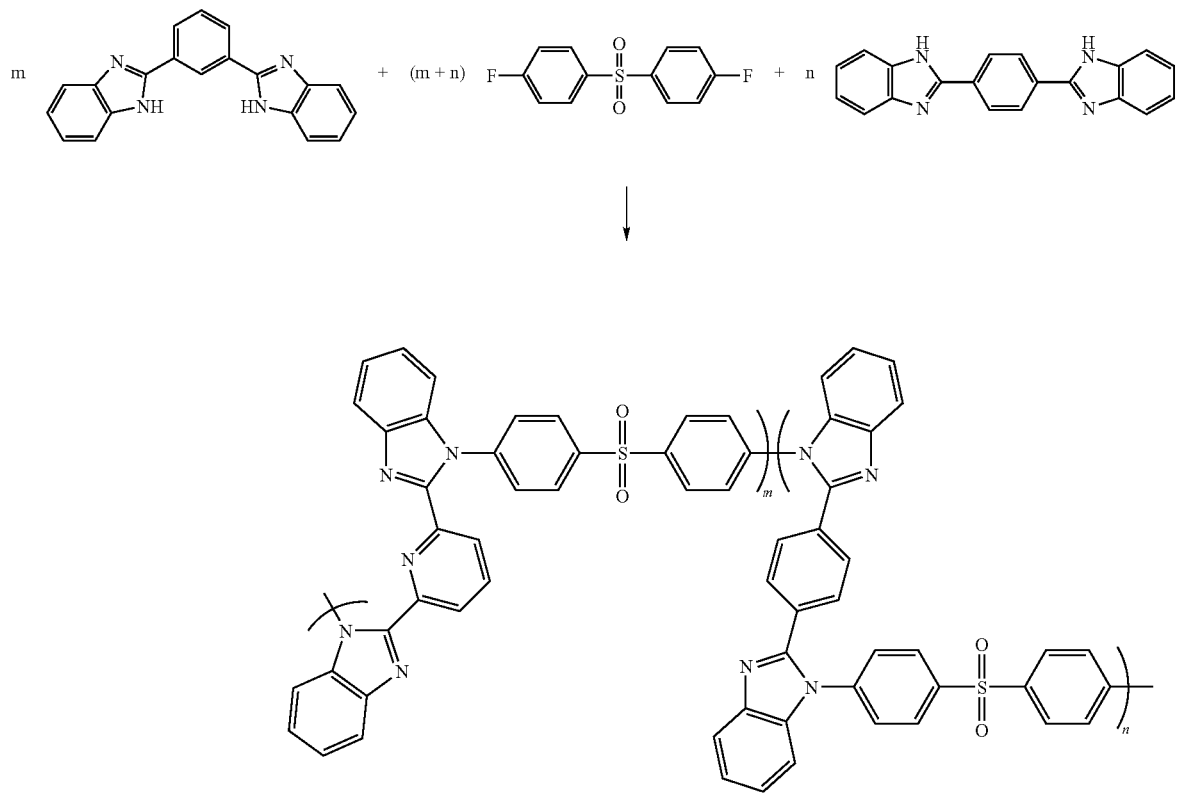

The polymer was prepared in a manner similar to Example 1. The resulting polymer was not very soluble in chloroform and gave a brittle film by casting from its DMSO-solution.

Example 3

Copolymer of 1,3-dibenzimidazolylbenzene and 2,6-bisbenzimidazolylpyridine 50/50

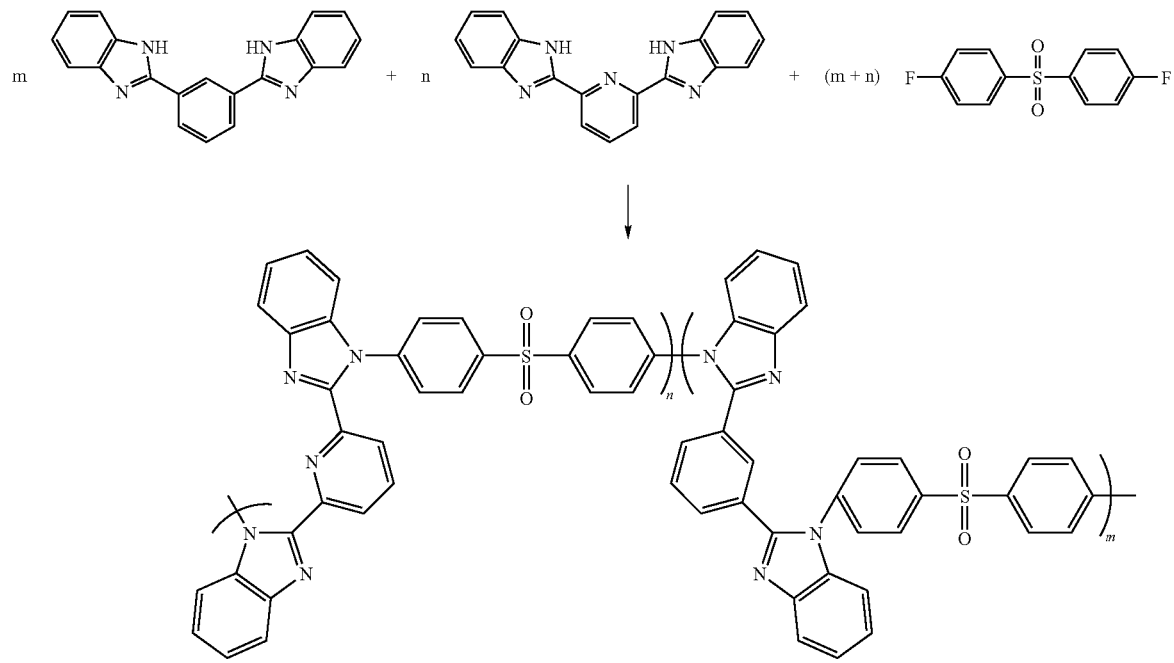

A 25 mL three-necked round-bottom flask was equipped with an argon inlet, magnetic stirrer, a Dean-Stark trap and condenser. The flask was flushed with argon, and then charged with 1, 3-dibenzimidazolylbenzene (0.20 g, 0.64 mmol), 2,6-bisbenzimidazolylpyridine (0.20 g, 0.64 mmol), bis(4-fluorophenyl)sulfone (0.33 g, 1.3 mmol), calcium carbonate (0.13 g, 1.3 mmol), anhydrous potassium carbonate (0.20 g, 1.4 mmol), sulfolane (2 mL), and chlorobenzene (3 mL). The mixture was heated to azeotrope off the resulting water with chlorobenzene. The chlorobenzene was then removed, and the reaction mixture was brought up to 180-190° C. for 2 h, and then at 210° C. for 2 h additional. 1 mL of sulfolane was added to dilute the solution that was kept at 210° C. for 4 h. When the viscosity significantly increased the reaction mixture was cooled down and diluted. The resulting solution was poured into 200 mL of methanol and 2 mL of acetic acid to precipitate out the polymer. The resulting polymer was redissolved in DMSO. The polymer solution was filtered through a thin layer of Celite (trademark) to remove inorganic materials, and the polymer was precipitated out by pouring into methanol. The polymer was redissolved in chloroform, and reverse precipitated in methanol. The polymer was collected and dried in vacuo at 80° C. for 24 h. Yield 90%.

Copolymerization Reactions with Bisphenols

General Procedure

The synthesis of most of the copolymers were carried out in sulfolane. The polymerization was conducted initially at 160-170° C. for 1.5-2 h to remove the water with chlorobenzene and then at 180-200° C. to effect the polymerization reaction.

Examples 4-6

Copolymerization of 1,3-dibenzimidazolylbenzene with 4,4'-biphenol

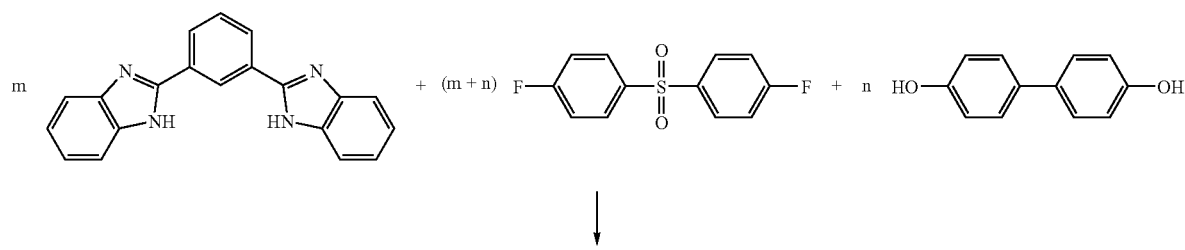

-continued

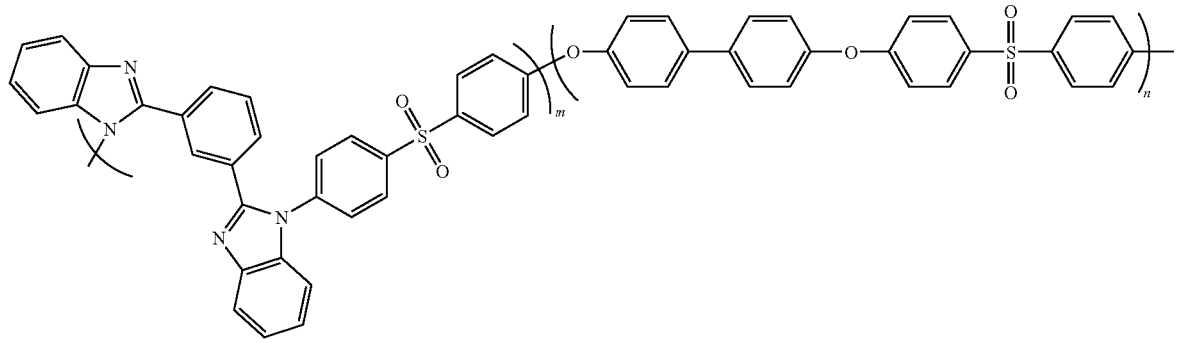

Example 4 is typical of the procedure used.

To a 25 mL three-necked round-bottom flask equipped with a Dean-stark trap, a water condenser, a magnetic stirrer and a nitrogen inlet were added 4,4'-biphenol (0.056 g 0.30 mmol), 1,3-dibenzimidazolylbenzene (0.22 g, 0.70 mmol), bis(4-fluorophenyl)sulfone (0.25 g, 1.0 mmol), calcium carbonate (0.15 g, 1.5 mmol), anhydrous potassium carbonate (0.28 g, 2.0 mmol), sulfolane (2 mL), and chlorobenzene (3 mL). The mixture was heated to azeotrope off the resulting water with the chlorobenzene. The chlorobenzene was then removed, and the reaction mixture was brought up to 180-190° C. for 1-2 h. When the reaction mixture became too viscous to be stirred, an additional 2 mL of sulfolane was added to dilute the solution and it was kept at that temperature for 20 min. When the viscosity increased, the reaction mixture was cooled down, and diluted with dichloromethane. The solution was poured into 200 mL of methanol and 2 mL of acetic acid to precipitate out the polymer. The resulting polymer was redissolved in chloroform. The polymer solution was filtered through a thin layer of Celite (trademark) to remove inorganic materials, and the polymer was precipitated out by pouring into methanol. The polymer was collected by filtration and dried in vacuo at 80° C. for 24 h. Yield 97%.

The property data for the copolymers is shown in the table.

| Examples | dibenzimidazolylbenzene | biphenol | Tg (° C.) | TGA-5% (° C.) | ξ inh (dL/g) |
|---|---|---|---|---|---|
| 1 | 100% |  | 295 | 530 | 0.22 |
| 4 | 70% | 30% | 274 | 519 | 0.44 |
| 5 | 50% | 50% | 260 | 533 | 0.34 |
| 6 | 30% | 70% | 248 | 521 | 0.75 |

Examples 7-10

Copolymerization of 1,3-dibenzimidazolylbenzene with 4,4'-dihydroxybenzophenone

Example 7 is typical of the reaction conditions used.

To a 25 mL three-necked round-bottom flask equipped with a Dean-stark trap, a water condenser, a magnetic stirrer and a nitrogen inlet were added 4,4'-dihydroxybenzophenone (0.13 g, 0.60 mmol), 1,3-dibenzimidazolylbenzene (0.43 g, 1.4 mmol), bis(4-fluorophenyl)sulfone (0.51 g, 2.0 mmol), calcium carbonate (0.22 g, 2.2 mmol), anhydrous

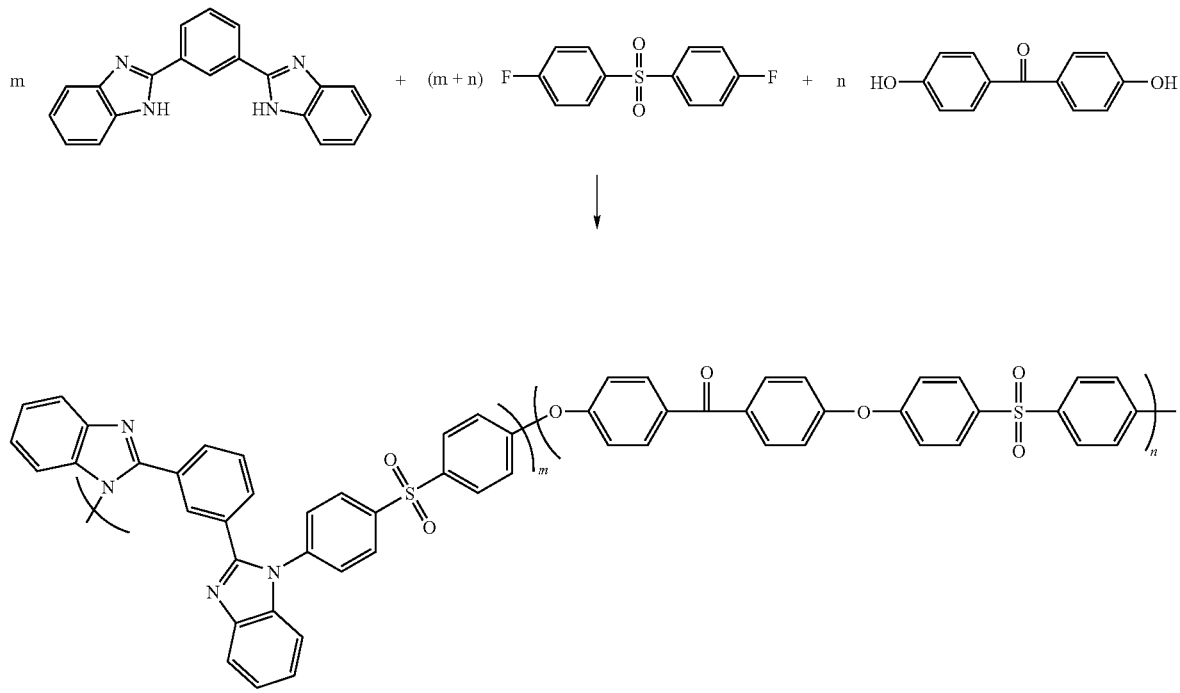

potassium carbonate (0.28 g, 2.0 mmol), sulfolane (2 mL), and chlorobenzene (3 mL). The mixture was heated to azeotrope off the resulting water with chlorobenzene. The chlorobenzene was then removed, and the reaction mixture was brought up to 180-190° C. for 1-2 h. When the reaction mixture became too viscous to be stirred, an additional 2 mL of sulfolane was added to dilute the solution that was kept at that temperature for 20 min. When the viscosity was increased, the reaction mixture was cooled down and diluted with dichloromethane and then the solution was poured into 200 mL of methanol and 2 mL of acetic acid to precipitate out the polymer. The resulting polymer was redissolved in chloroform. The polymer solution was filtered through a thin layer of Celite (trademark) to remove inorganic materials, and the polymer was precipitated out by pouring into methanol. The polymer was collected by filtration and dried in vacuo at 80° C. for 24 h. Yield 95%.

The property data for the copolymers are shown in the table.

| Examples | [benzimidazole diamine structure] | [dihydroxybenzophenone structure] | Tg (°C) | TGA-5% (°C) | $\eta_{inh}$ (dL/g) |
|---|---|---|---|---|---|
| 7 | 70% | 30% | 265 | 539 | 0.28 |
| 8 | 50% | 50% | 247 | 540 | 0.32 |
| 9 | 40% | 60% | 240 | 537 | 0.44 |
| 10 | 30% | 70% | 230 | 536 | 0.43 |

Examples 11-12
Copolymer of 4,4'-bisbenzimidazolyldiphenyl ether with 4,4'-biphenol
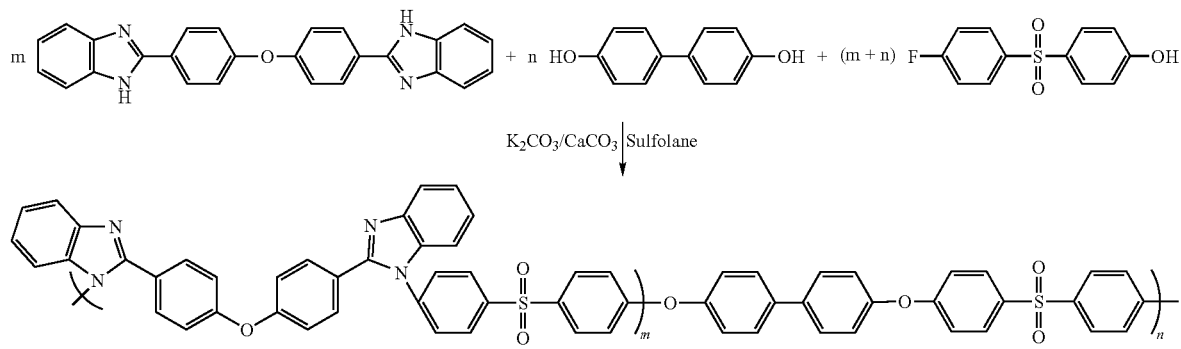
The copolymers were prepared as in Example 4.
| Examples | HO—⟨⟩—⟨⟩—OH | benzimidazolyl diphenyl ether | Tg (°C) | TGA-5% (°C) | $\eta_{inh}$ (dL/g) |
|---|---|---|---|---|---|
| 11 | 70% | 30% | 255 | 524 | 0.43 |
| 12 | 50% | 50% | 268 | 535 | 0.60 |
Example 13
Copolymer of 1,2-dibenzimidazolylbenzene with 4,4'-biphenol
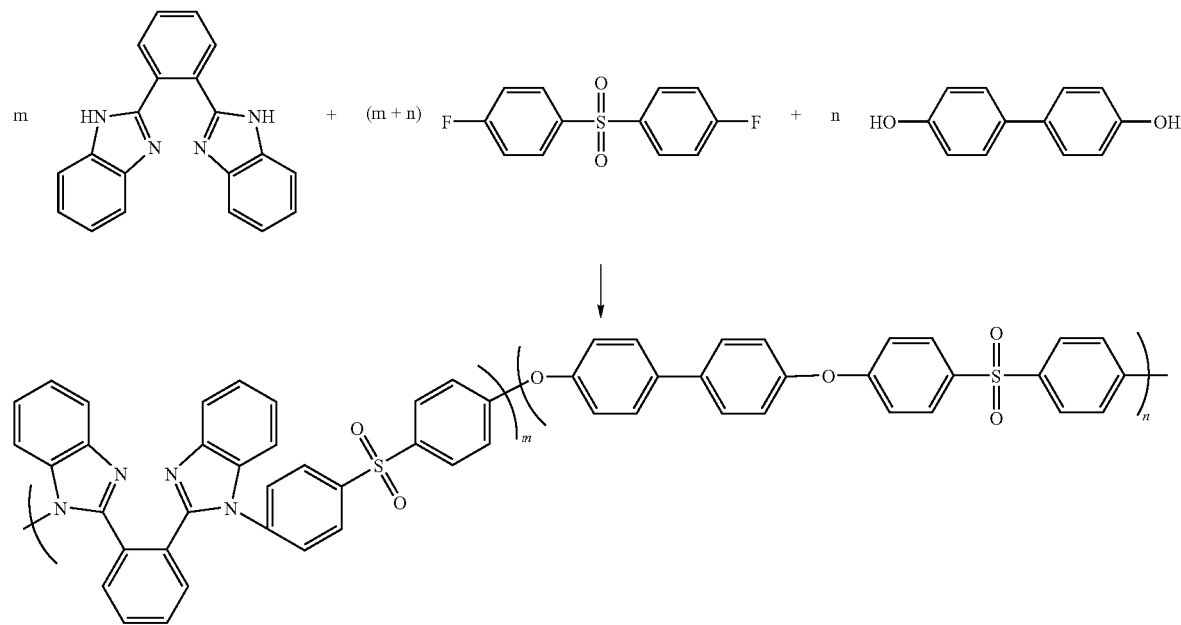
The copolymer was prepared as in Example 4.

Example 14
Copolymer of 1,4-dibenzimidazolylbenzene with 4,4'-dihydroxybenzophenone
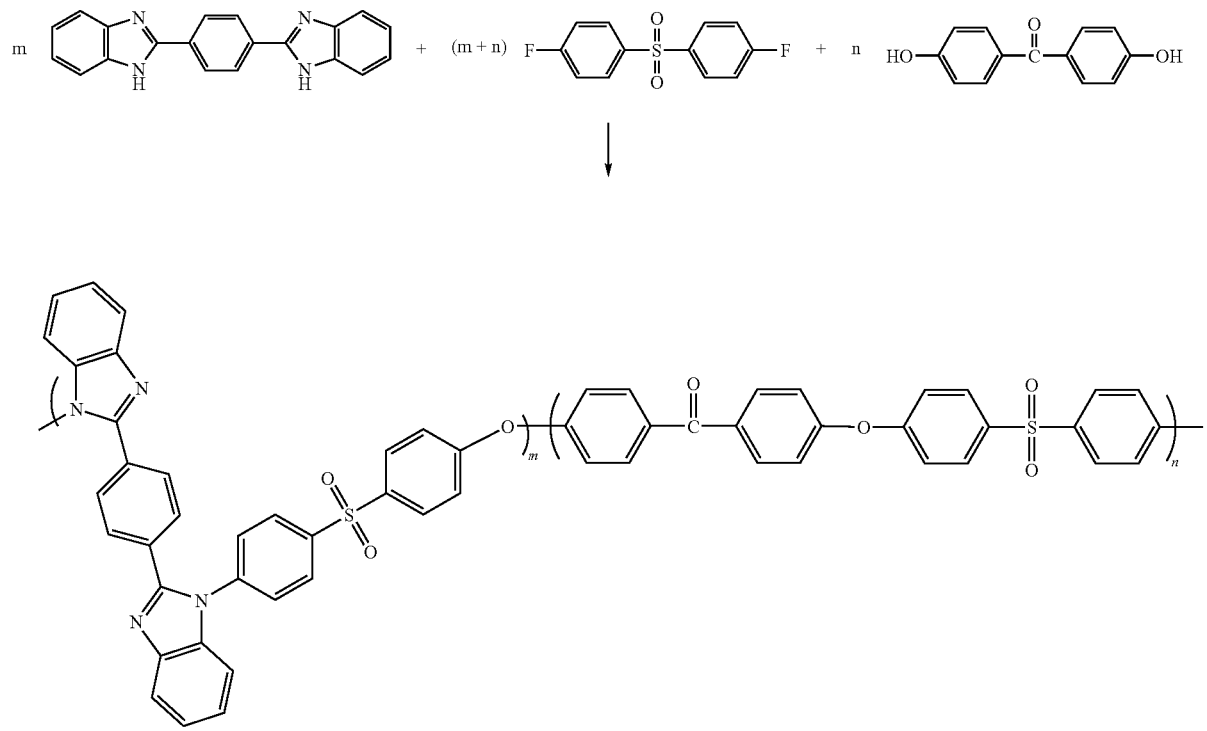
The copolymer was prepared as in Example 4.
| Example | (1,4-dibenzimidazolylbenzene) | (4,4'-dihydroxybenzophenone) | Tg (°C) | TGA-5% (°C) | $\eta_{inh}$ (dL/g) |
|---|---|---|---|---|---|
| 14 | 30% | 70% | 260 | 440 | ND |
Examples 15-17
Copolymers from 2,6-bisbenzimidazolylpyridine
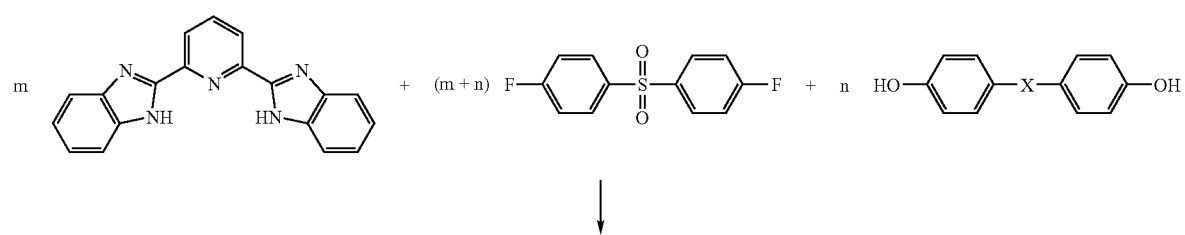

-continued

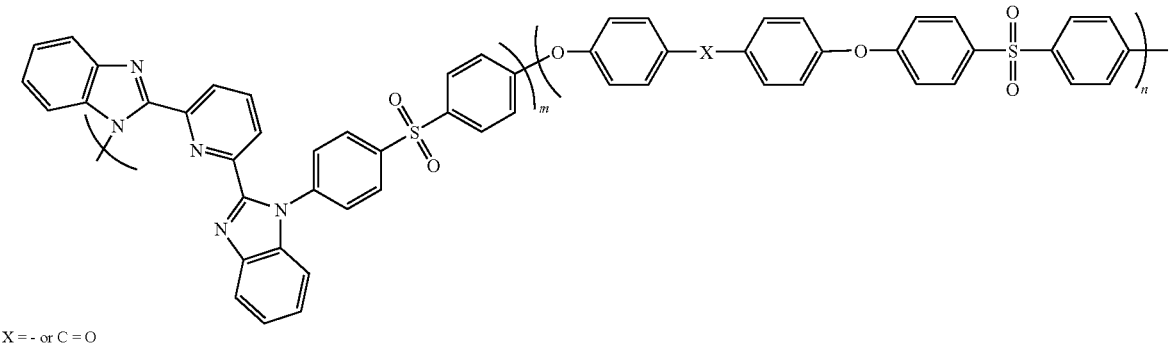

X = - or C = O

The polymers were prepared as in example 4.

| Examples | ![benzimidazole-pyridine] | ![HO-Ph-CO-Ph-OH] | ![HO-biphenyl-OH] | Tg (°C) | TGA (°C) | $\eta_{inh}$ (dL/g) |
|---|---|---|---|---|---|---|
| 15 | 30% | | 70% | ND | 521 | 0.68 |
| 16 | 50% | 50% | | 242 | 524 | 0.33 |
| 17 | 70% | 30% | | 253 | 536 | 0.23 |

Polymers from 2-(4-hydroxyphenyl)benzimidazole

Example 18

Copolymerization of 2-(4-hydroxyphenyl)benzimidazole with 4,4'-biphenol

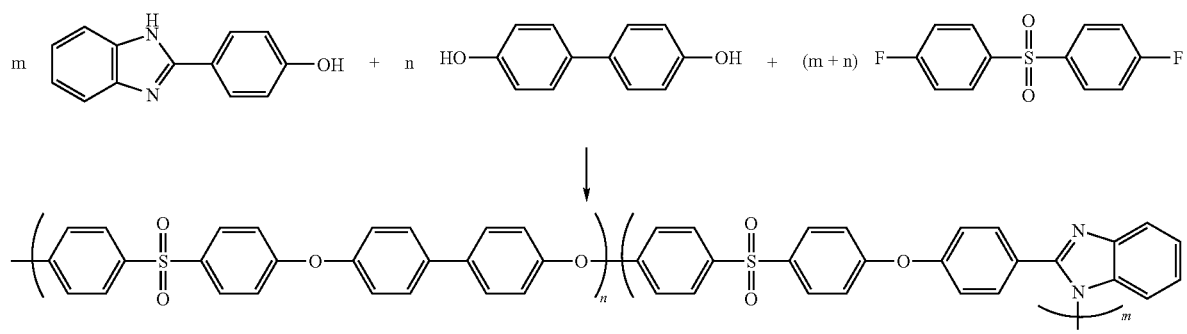

To a 25 mL three-necked round-bottom flask were added 2-(4-hydroxyphenyl)benzimidazole (0.15 g, 0.71 mmol), bis(4-fluorophenyl)sulfone (0.36 g, 1.4 mmol), calcium carbonate (0.22 g, 2.2 mmol), anhydrous potassium carbonate (0.28 g, 2.0 mmol), sulfolane (1.5 mL), and chlorobenzene (3 mL). The mixture was heated to azeotrope off the resulting water with chlorobenzene. The chlorobenzene was then removed, and the reaction mixture was brought up to 180-190° C. for 1-2 h. The resulting mixture was analyzed by HPLC and MALDI-TOF mass spectrometry. The MALDI-TOF-MS spectrum showed the product was oligomeric with all the OH & NH groups reacted. 4,4'-biphenol (0.13 g, 0.71 mmol) and cesium carbonate (0.19 g, 0.58 mmol) were added and the reaction mixture was brought up to 180-190° C. for 1 h. When the reaction system became too viscous to be stirred, an additional 2 mL of sulfolane was added to dilute the solution and it was maintained at 180° C. for 0.5 h. When the viscosity increased, the resulting mixture was cooled down and diluted with dichloromethane and the solution was poured into 200 mL of methanol and 2 mL of acetic acid to precipitate out the polymer. The resulting polymer was redissolved in chloroform. The polymer solution was filtered through a thin layer of Celite (trademark) to remove inorganic materials, and the polymer was precipitated out by pouring into methanol. The polymer was collected and dried in vacuo at 80° C. for 24 h.

Yield 95%. A flexible thin film was cast from its chloroform-solution. Tg 251° C., TGA-5% weight loss at 532° C.

Example 19

Copolymerization of 2-(4-hydroxyphenyl)benzimidazole with bisphenol A (BPA)

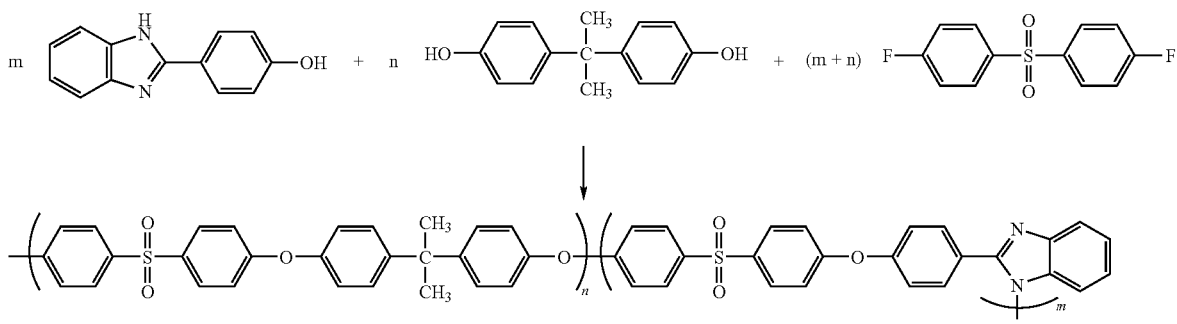

To a 25 mL three-necked round-bottom flask equipped with a Dean-Stark trap, a water condenser, a magnetic stirrer and a nitrogen inlet were added BPA (0.16 g, 0.71 mmol), 2-(4-hydroxyphenyl)benzimidazole (0.15 g, 0.71 mmol), bis(4-fluorophenyl)sulfone (0.36 g, 1.4 mmol), calcium carbonate (0.22 g, 2.2 mmol), anhydrous potassium carbonate (0.28 g, 2.0 mmol), cesium carbonate (0.19 g, 0.58 mmol), sulfolane (1.5 mL), and chlorobenzene (3 mL). The mixture was heated to azeotrope off the resulting water with chlorobenzene. The chlorobenzene was then removed. The reaction mixture was brought up to 180-190° C. for 1 h. When the reaction mixture became too viscous to be stirred, an additional 2 mL of sulfolane was added to dilute the solution and it was kept at that temperature for 30 min. When the viscosity increased, the reaction mixture was cooled down and diluted with dichloromethane and the solution was poured into 200 mL of methanol and 2 mL of acetic acid to precipitate out the polymer. The resulting polymer was redissolved in chloroform. The polymer solution was filtered through a thin layer of Celite (trademark) to remove inorganic materials, and the polymer was precipitated out by pouring into methanol. The fibrous polymer was collected and dried in vacuo at 80° C. for 24 h. Yield 97%. A good film was cast from its chloroform-solution. Tg 230° C., TGA −5% weight loss 489° C.

Example 20

Copolymer of 1,3-dibenzimidazolylbenzene with BPA: polyetherketone

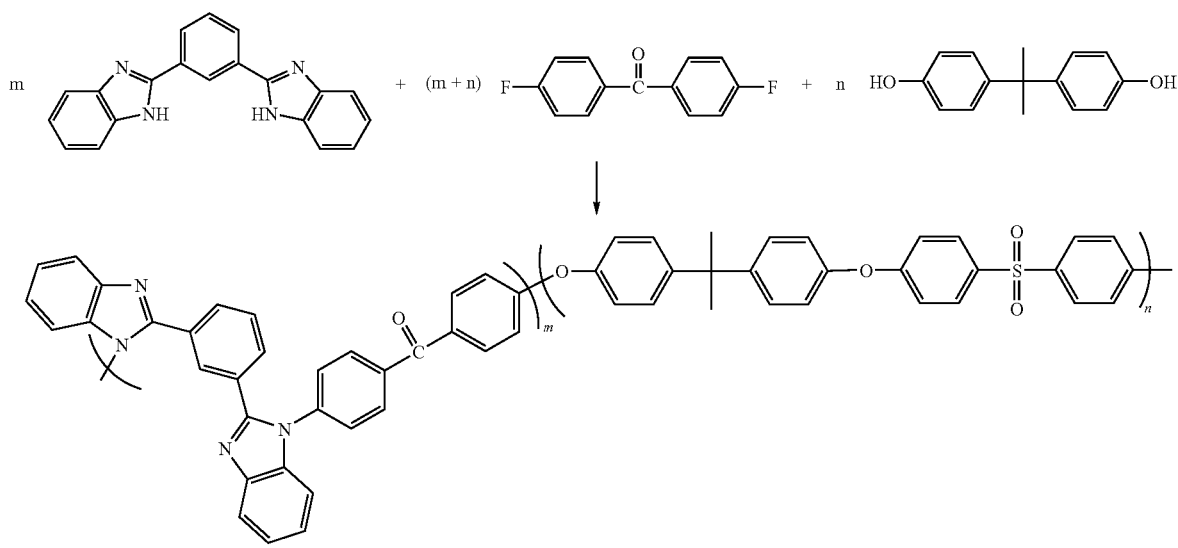

To a 25 mL three-necked round-bottom flask equipped with a Dean-stark trap, a water condenser, a magnetic stirrer and a nitrogen inlet there were added BPA (0.22 g, 0.97 mmol), 1,3-dibenzimidazolylbenzene (0.30 g, 0.97 mmol), 4,4'-difluorobenzophenone (0.42 g, 1.9 mmol), anhydrous potassium carbonate (0.28 g, 2.0 mmol), cesium carbonate (0.19 g, 0.58 mmol), sulfolane (1.5 mL), and chlorobenzene (3 mL). The mixture was heated to azeotrope off the resulting water with the chlorobenzene. The chlorobenzene was then removed. The reaction mixture was brought up to 180-190° C. After heating for 3 h, the reaction mixture became too viscous to be stirred. An additional 2 mL of sulfolane was then added to dilute the solution, and the resulting mixture was kept at this temperature for an additional 30 min. The viscous solution was cooled down and diluted with dichloromethane and the solution was poured into a mixture composed of methanol (100 mL)/water (100 mL)/acetic acid (2 mL) to precipitate out the polymer. The resulting polymer was redissolved in chloroform. The polymer solution was filtered through a thin layer of Celite (trademark) to remove inorganic materials, and the polymer was precipitated out by pouring into methanol. The fibrous polymer was collected and dried in vacuo at 80° C. for 24 h. Yield 98%. A good film was cast from its chloroform-solution.

The polymer was soluble in THF. Tg 119° C., TGA −5% weight loss 545° C., Mn 18000, Mw 49000, MWD 2.8, $\eta_{inh}$ 0.38 dL/g.

Example 21

Copolymer of 2,6-bisbenzimidazolylpyridine with 4,4'-(perfluoropropane-2,2-diyl)diphenol: polyethersulfone chlorobenzene. The chlorobenzene was then removed, and the orange colored reaction mixture was brought up to 180-190° C. After heating for 2 h, the reaction mixture became reddish, and too viscous to be stirred. An additional 2 ml of sulfolane was then added to dilute the mixture, and the resulting mixture was kept at this temperature for an additional 30 min. When the reaction mixture changed into dark red and the viscosity increased significantly, the resulting mixture was cooled down, and diluted with dichloromethane. The resulting mixture was poured into a mixture composed of methanol (100 mL)/water (100 mL)/acetic acid (2 mL) to precipitate out the polymer. The precipitated polymer was redissolved in chloroform. The polymer solution was filtered through a thin layer of Celite (trademark) to remove inorganic materials. The polymer was precipitated out by pouring the chloroform solution into methanol. The polymer was collected by filtration, and dried in vacuo at 80° C. for 24 h. Strong cast films were obtained from its chloroform-solution. The polymer was soluble in THF. Tg 245° C., TGA −5% weight loss 534° C., Mn 35000, Mw 79000, MWD 2.2, $\eta_{inh}$ 0.29 dL/g.

UV Absorption and Fluorescence

All of the Homopolymers and Copolymers Containing the Benzimidazole Groups Strongly Absorb UV Light and are Fluorescent as Shown in Table 1.

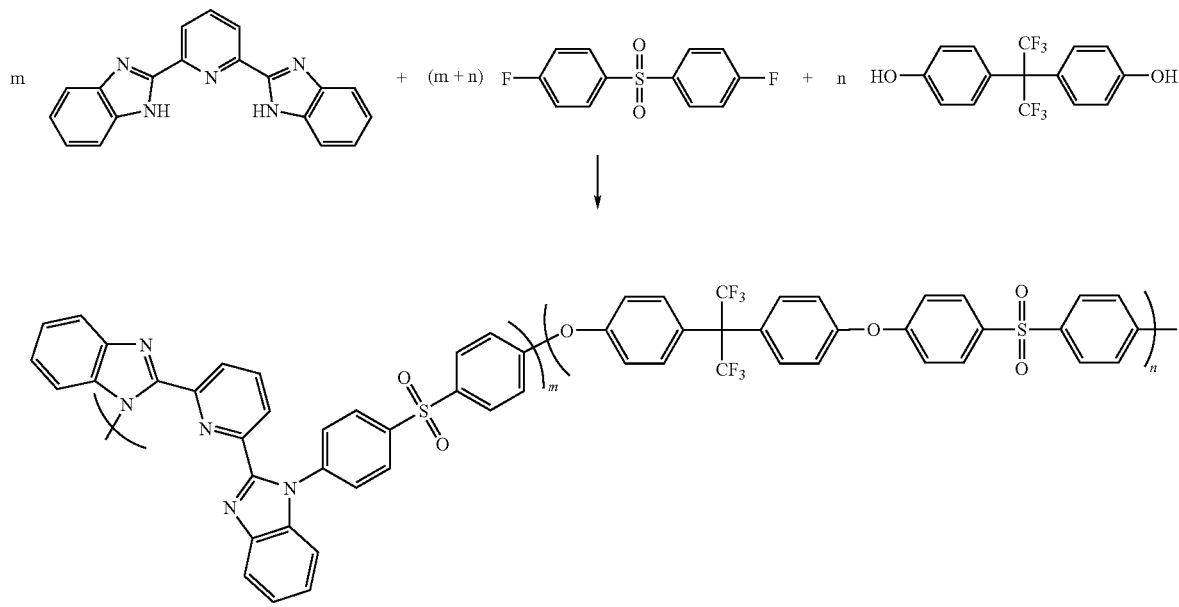

To a 25 mL three-necked round-bottom flask equipped with a Dean-stark trap, a water condenser, a magnetic stirrer and a nitrogen inlet were added 4,4'-(perfluoropropane-2,2-diyl)diphenol (0.32 g, 0.96 mmol), 2,6-bisbenzimidazoylpyridine (0.30 g, 0.96 mmol), bis(4-fluorophenyl)sulfone (0.49 g, 1.9 mmol), anhydrous potassium carbonate (0.28 g, 2.0 mmol), sulfolane (1.5 mL), and chlorobenzene (3 mL). The mixture was heated to azeotrope off the resulting water with

TABLE 1

UV absorption and fluorescence properties of polymers

| Examples | $\lambda_{abs, nm}$[a] | $\lambda_{ex, nm}$[b] | $\lambda_{em, nm}$[c] |
|---|---|---|---|
| 4 | 282 | 327 | 387 |
| 5 | 282 | 278 | 379 |
| 6 | 278-281 | 319 | 378 |

TABLE 1-continued

UV absorption and fluorescence properties of polymers

| Examples | $\lambda_{abs, nm}{}^a$ | $\lambda_{ex, nm}{}^b$ | $\lambda_{em, nm}{}^c$ |
|---|---|---|---|
| 7 | 288 | 331 | 387 |
| 8 | 285 | 327 | 382 |
| 9 | 285-287 | 319 | 381 |
| 10 | 285-290 | 314 | 380 |
| 12 | 283 | 300 | 408 |
| 13 | 279 | 314 | 401 |
| 14 | 282 | 328 | 375, 395, 417 |
| 15 | 281 | 315, 329 | 378 |
| 16 | 286 | 314 | 376 |
| 17 | 286-287 | 341 | 379 |

[a]Maximum absorption wavenumber in UV-vis spectra
[b]Excitation wavenumber.
[c]Emission wavenumber.

Copolymers from bis(4-chlorophenyl)sulfone with 4,4'-biphenol

Examples 22-26

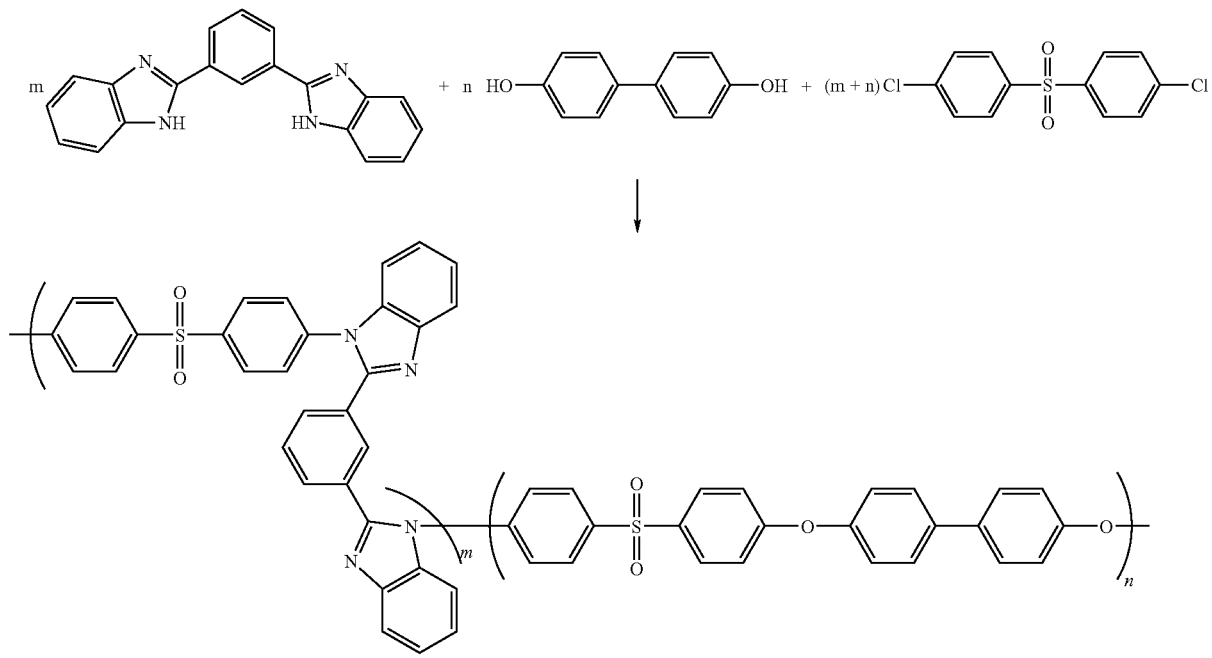

Example 22 is typical of the reaction conditions used. 1,3-Dibenzimidazolylbenzene g, 1.0 mmol), 4,4'-biphenol (0.19 g, 1.0 mmol), cesium carbonate (0.20 g, 0.60 mmol), potassium carbonate (0.21 g, 1.5 mmol), diphenylsulfone (1.5 g), and chlorobenzene (3 mL) were charged into a 25 mL three-necked round-bottom flask equipped with a magnetic stirrer, an Ar inlet, and a Dean-Stark trap with a condenser under Ar atmosphere. The mixture was heated and stirred at 170° C. for 1 h to azeotrope off water. After the removal of chlorobenzene, the reaction mixture was cooled. To the cooled reaction mixture was added bis(4-chlorophenyl)sulfone (0.59 g, 2.0 mmol). The mixture was heated and stirred at 280° C. for 0.5 h, and then was heated to 300° C. for 15 h with the frequent addition of another 1 g of diphenyl sulfone, each time the reaction system became too viscous to be stirred. The resulting mixture was cooled, quenched by addition of acetic acid, and then poured into methanol. The precipitated polymer was collected by filtration and washed with boiling methanol. The crude polymer was redissolved in chloroform. The chloroform solution was filtered through a thin layer of Celite (trademark) to remove inorganic materials. The polymer was further purified by reprecipitation from chloroform solution into methanol. The polymer collected by filtration was washed thoroughly with boiling methanol, and dried in vacuo at 40° C. overnight. Yield 90%. The resulting polymer was soluble in various organic solvents such as chloroform. Flexible, and transparent films were obtained by casting from its chloroform solution.

Example 23

The copolymer was prepared in the same manner to Example 22, except that potassium hydroxide (3.6 mmol) and cesium carbonate (0.40 mmol) were used as base instead of potassium carbonate (1.5 mmol) and cesium carbonate (0.60 mmol). The polymerization was completed by heating at 250° C. for 7 h. Yield 84%. The resulting polymer was soluble in various organic solvents such as chloroform. Creasable, colorless and transparent films were obtained by casting from its chloroform solution.

Example 24

The copolymer was prepared in the same manner to Example 22, except that potassium hydroxide (3.6 mmol) and potassium carbonate (0.40 mmol) were used as base instead of potassium carbonate (1.5 mmol) and cesium carbonate (0.60 mmol). The polymerization was completed by heating at 256-258° C. for 20 h. Yield 91%. The resulting polymer was soluble in various organic solvents such as chloroform. Creasable, colorless and transparent films were obtained by casting from its chloroform solution.

Example 25

The copolymer was prepared in the same manner as Example 24, except that benzophenone was used as solvent instead of diphenylsulfone. The polymerization was completed by heating at 260° C. for 66 h. Yield 99%. The resulting polymer was soluble in various organic solvents such as chloroform. Yellow, and slightly brittle films were obtained by casting from its chloroform solution.

Example 26

The copolymer was prepared in the same manner as Example 22, except that sulfolane was used as solvent instead of diphenyl sulfone, and that potassium hydroxide (3.6 mmol), cesium carbonate (0.20 mmol), and potassium carbonate (4.0 mmol) were used as base instead of potassium carbonate (1.5 mmol) and cesium carbonate (0.60 mmol). The polymerization was completed by heating at 170-180° C. for 3.5 d. Yield 93%. The resulting polymer was soluble in polar organic solvents such as NMP. Yellow, and slightly brittle films were obtained by casting from its DMAc solution.

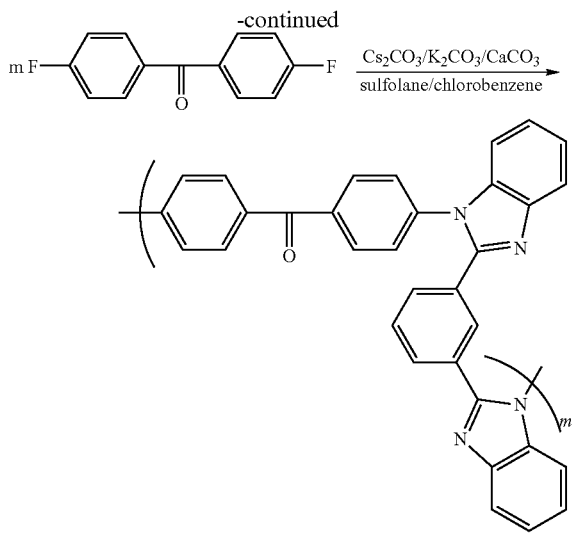

| Examples | Solvent | [dibenzimidazolylbenzene] | [biphenol] | [dichlorodiphenylsulfone] | Tg (° C.) | TGA-5% (° C.) | $\eta_{inh}$ (dL/g) |
|---|---|---|---|---|---|---|---|
| 22 | Diphenyl sulphone | 50% | 50% | 100% | 254 | 543 | 0.35 |
| 23 | Diphenyl sulphone | 30% | 70% | 100% | 242 | 541 | 0.34 |
| 24 | Diphenyl sulfone | 30% | 70% | 100% | 242 | 548 | 0.36 |
| 25 | Benzophenone | 30% | 70% | 100% | 235 | 548 | 0.29 |
| 26 | Sulfolane | 30% | 70% | 100% | 241 | 517 | 0.36 |

Homopolymers from 4,4'-difluorobenzophenone

Example 27

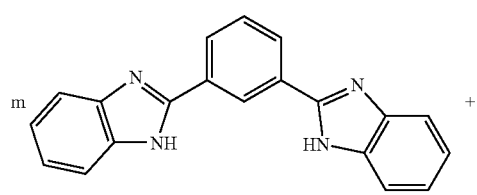

1,3-Dibenzimidazolylbenzene (0.62 g, 2.0 mmol), cesium carbonate (0.098 g, 0.30 mmol), potassium carbonate (0.25 g, 1.8 mmol), sulfolane (1 g), and chlorobenzene (3 mL) were charged into a 25 mL three-necked round-bottom flask equipped with a magnetic stirrer, an Ar inlet, and a Dean-Stark trap with a condenser under Ar atmosphere. The mixture was heated and stirred at 170° C. for 1 h to azeotrope off water. After the removal of chlorobenzene, the reaction mixture was cooled. To the cooled reaction mixture was added 4,4'-difluorobenzophenone (0.44 g, 2.0 mmol) and calcium carbonate (0.21 g, 2.1 mmol). The mixture was heated and stirred at 215° C. for 2.5 h with the frequent addition of another 1 g of sulfolane each time the reaction system became too viscous to be stirred. The resulting mixture was cooled, quenched by addition of acetic acid, and then poured into methanol to precipitate a light yellow fiber. The precipitated polymer was collected by filtration and washed with boiling methanol. The crude polymer was purified by extraction with boiling distilled water to remove any salt. The polymer collected by filtration was washed with boiling methanol, and dried in vacuo at 40° C. overnight. Yield 93%. The resulting polymer was soluble in polar organic solvents such as NMP or DMAc. Flexible, and light yellow films were obtained by casting from its NMP solution.

Copolymers from 4,4'-difluorobenzophenone and bis(4-chlorophenyl)sulfone with 4,4'-biphenol General Procedure All the polymerizations of bisbenzimidazoles with 4,4'-difluorobenzophenone were carried out in sulfolane. The copolymerization was conducted by one-pot two-step procedures: (1) reaction of bisbenzimidazole and 4,4'-difluorobenzophenone; (2) the reaction of bis(4-chlorophenyl)sulfone and 4,4'-biphenol.

Example 28-29 ture was heated and stirred at 180° C. for 1 h to azeotrope off water. After the removal of chlorobenzene, the reaction mixture was cooled. To the cooled reaction mixture was added 4,4'-difluorobenzophenone (0.32 g, 1.5 mmol) and calcium carbonate (0.15 g, 1.5 mmol). The mixture was heated and stirred at 220° C. for 3.5 h with the frequent addition of another 1 g of sulfolane each time the reaction system became too viscous to be stirred. The resulting mixture was cooled. To the cooled resulting mixture was added 4,4'-biphenol (0.11 g, 0.60 mmol), cesium carbonate (0.029 g, 0.090 mmol), potassium carbonate (0.075 g, 0.54 mmol), sulfolane (0.5 g), and chlorobenzene (2 mL). The mixture was heated and stirred at 180° C. for 1 h to azeotrope off water. After the removal of chlorobenzene, the reaction mixture was cooled. To the cooled reaction mixture was added bis(4-chlorophenyl)sulfone (0.16 g, 0.54 mmol). The mixture was heated and stirred at 215° C. for 3 h with the frequent addition of another 1 g of sulfolane each time the reaction system became too viscous to be stirred. The resulting mixture was cooled, quenched by addition of acetic acid, and then poured into methanol to precipitate a light yellow fiber. The precipitated polymer was collected by filtration and washed with boiling methanol. The crude polymer was purified by extraction with boiling dis-

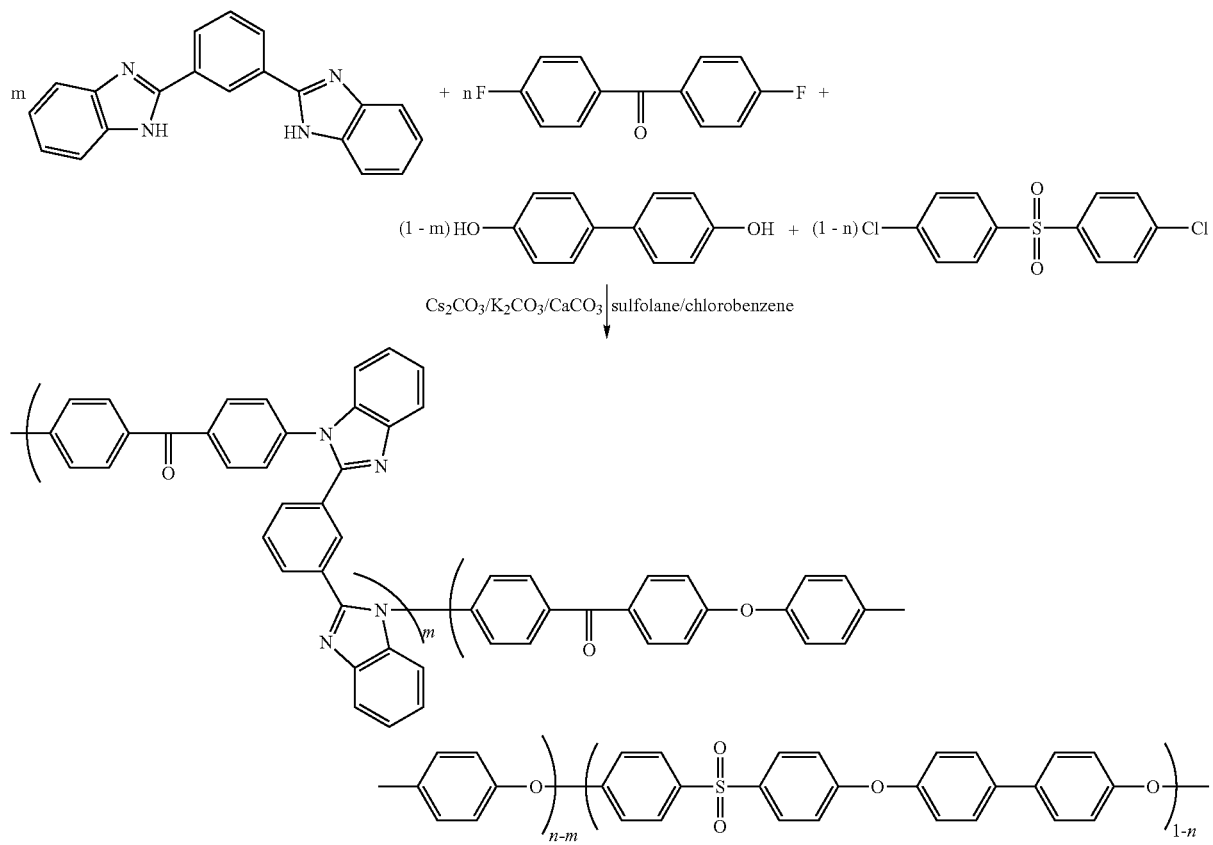

Example 28 is typical of the reaction conditions used. 1,3-Dibenzimidazolylbenzene (0.43 g, 1.4 mmol), cesium carbonate (0.068 g, 0.21 mmol), potassium carbonate (0.17 g, 1.3 mmol), sulfolane (1 g), and chlorobenzene (3 mL) were charged into a 25 mL three-necked round-bottom flask equipped with a magnetic stirrer, an Ar inlet, and a Dean-Stark trap with a condenser under Ar atmosphere. The mixtilled water to remove any salt. The polymer collected by filtration was washed with boiling methanol, and dried in vacuo at 40° C. overnight. Yield 95%. The resulting polymer was mostly soluble in chloroform, and completely soluble in polar organic solvents such as DMAc. Creasable and light yellow cast films were obtained by casting from either its chloroform-solution or DMAc solution.

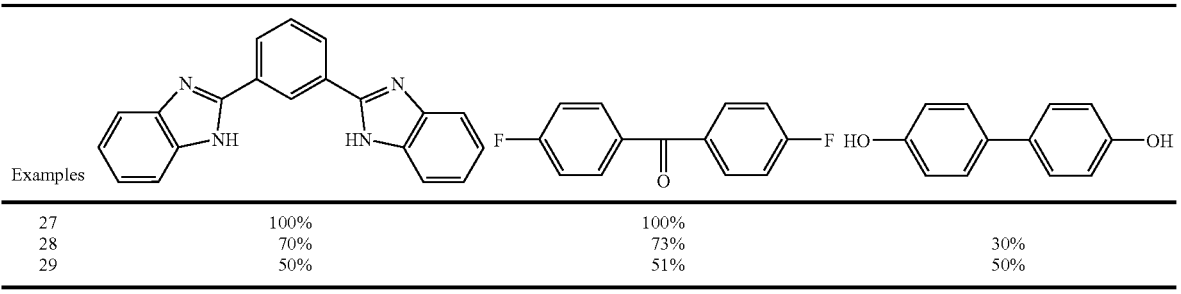
| Examples | | | |
|---|---|---|---|
| 27 | 100% | 100% | |
| 28 | 70% | 73% | 30% |
| 29 | 50% | 51% | 50% |
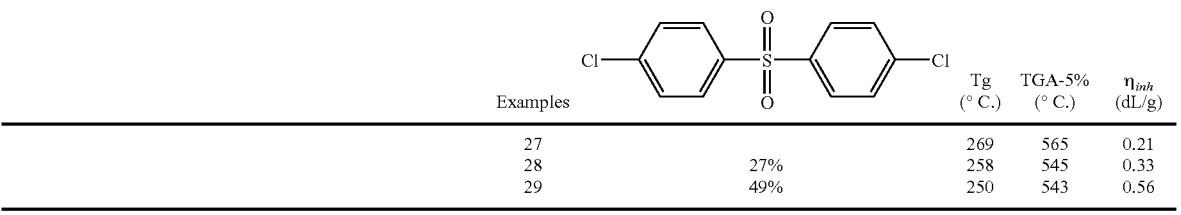
| Examples | | Tg (° C.) | TGA-5% (° C.) | $\eta_{inh}$ (dL/g) |
|---|---|---|---|---|
| 27 | | 269 | 565 | 0.21 |
| 28 | 27% | 258 | 545 | 0.33 |
| 29 | 49% | 250 | 543 | 0.56 |
Example 30
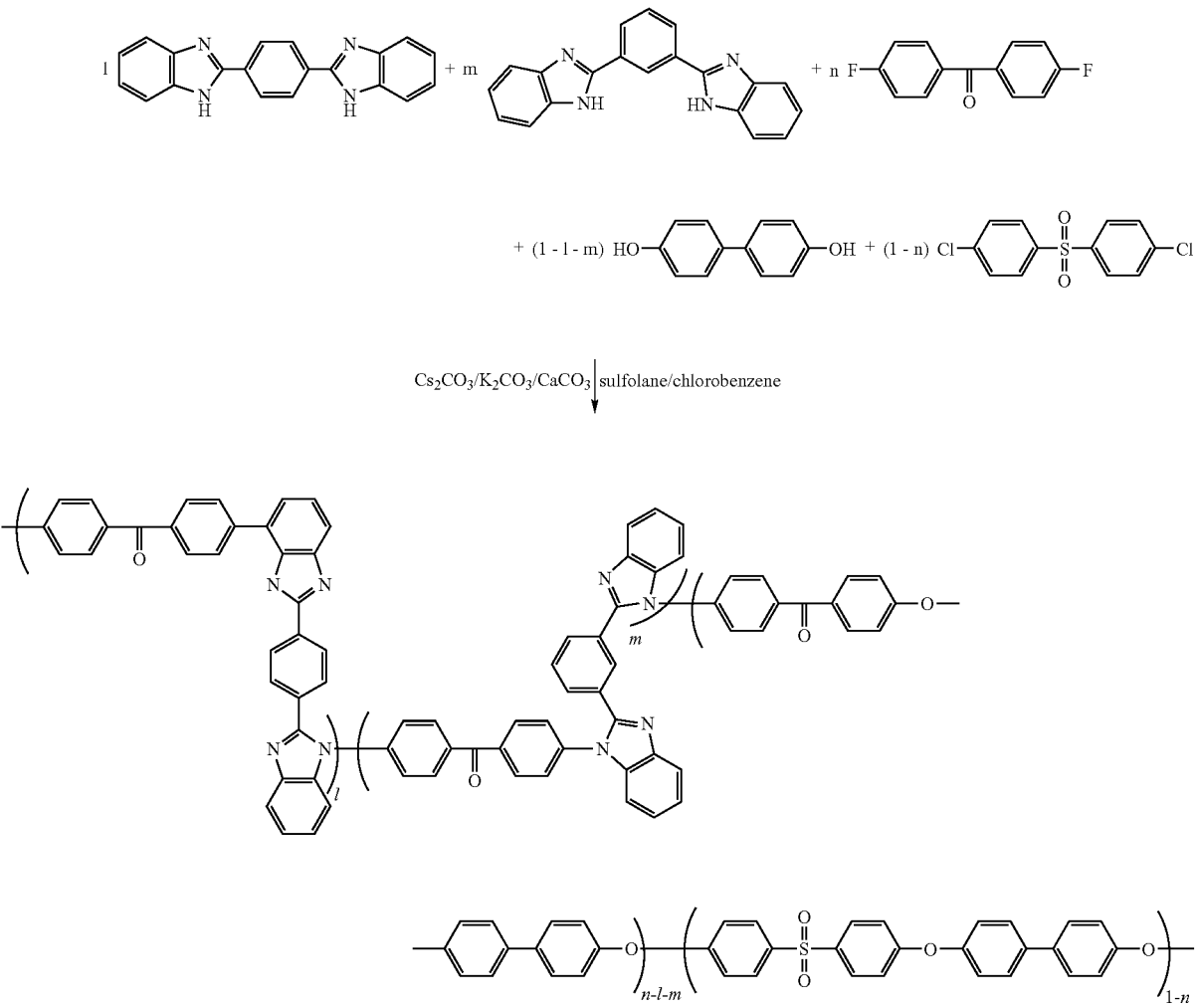

The polymer was prepared in a manner similar to Example 28. Yield 92%. The resulting polymer was soluble in polar organic solvents such as DMAc. Creasable and light yellow cast films were obtained by casting from either its chloroform solution or DMAc solution.

To a three-necked round-bottom flask equipped with a magnetic stirrer, a Dean-Stark trap, a condenser, and a nitrogen inlet were added 4,4'-difluorobenzophenone (0.44 g, 2.0 mmol), HQ (0.18 g, 1.6 mmol), 1,3-dibenzimidazolylbenzene (0.12 g, 0.40 mmol), potassium carbonate (0.25 g, 1.8

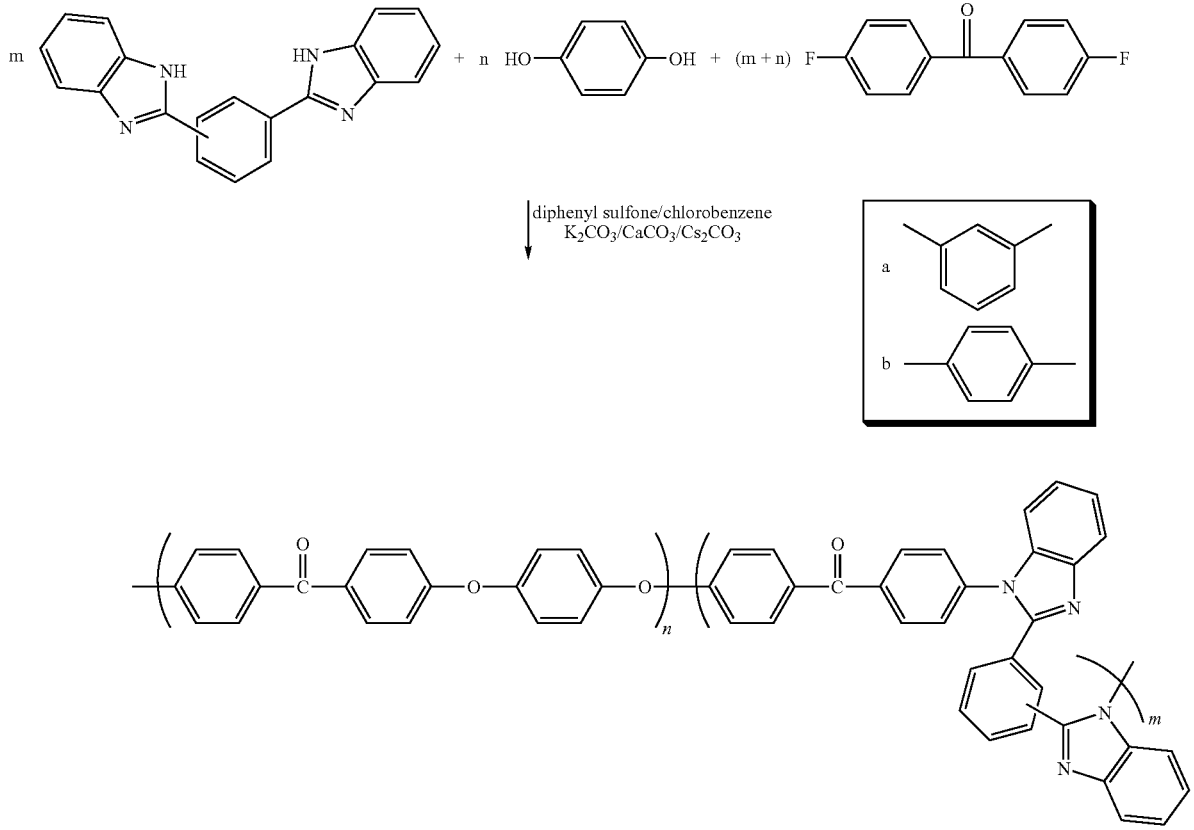

mmol), cesium carbonate (0.098 g, 0.30 mmol), calcium carbonate (0.21 g, 2.1 mmol), diphenyl sulfone (2 g), and chlorobenzene (3 mL). The mixture was heated and stirred at 170° C. for 1 h to azeotrope off water under nitrogen atmosphere.

Poly(Arylene Ether Ketone)s Copolymers Containing Hydroquinone (HQ) Moieties

Examples 31-36

The procedure for the copolymer from 1,3-dibenzimidazolylbenzene (Example 32: 20 mole %) is typical.

After the removal of chlorobenzene, the mixture was carefully brought up to 180-200° C. for 1 h, then heated at 230-

250° C. for 0.5 h, and finally heated at 300-313° C. for 1 h, with the frequent addition of another 1 g of diphenyl sulfone, each time the reaction system became too viscous to be stirred. The viscous reaction mixture was cooled, and quenched by addition of acetic acid. The reaction mixture was ground into fine powder in a blender with methanol. The fine powder was boiled in a mixture of methanol/water (3/1 v/v) for 1 h. The powder collected by filtration was boiled in acetone for 1 h. These extraction procedures were repeated twice. The resulting powdery polymer was washed with 5% HCl aqueous solution, with distilled water, and finally with acetone. The polymer was dried in vacuo at 40° C. for 24 h. Yields 94-98%. Flexible films were obtained with heating the powdery polymer sandwiched by glass plates at 300° C.

| Examples | Copolymer (mole % of dibenzimidazolylbenzene) | Tg (° C.) | Tm (° C.) | Tc (° C.) | TGA-5% (° C.) |
|---|---|---|---|---|---|
| 31 | 1,3-dibenzimidazolylbenzene (10%) | 156 | 308 | 196 | 501 |
| 32 | 1,3-dibenzimidazolylbenzene (20%) | 180 | 295 | 182 | 475 |
| 33 | 1,3-dibenzimidazolylbenzene (30%) | 173 | — | — | 456 |
| 34 | 1,4-dibenzimidazolylbenzene (10%) | 150 | 297 | 180 | 520 |
| 35 | 1,4-dibenzimidazolylbenzene (20%) | 173 | 302 | 233 | 495 |
| 36 | 1,4-dibenzimidazolylbenzene (30%) | 188 | — | — | 539 |

Tg, Tm, and Tc were taken from the second heating scan.

REFERENCES

1. Marvel, C. S, and H. A. Vogel, *Polybenzimidazoles and their preparation*, U.S. Pat. No. 3,174,947,
2. Vogel, H. and C. S. Marvel, *Polybenzimidazoles, New Thermally Stable Polymers*. J. Pol. Sci. Part A, 1961. L: p. 511-39.
3. Neuse, E. W., *Aromatic Polybenzimidazoles—Syntheses, Properties, and Applications*. Adv. Pol. Sci., 1982. 47: p. 1-42.
4. Chung, T. S., *A critical review of polybenzimidazoles: Historical development and future R&D*. J. Macro. Sci.-Rev. Macro. Chem. and Physics, 1997. C37: p. 277-301.
5. Hergenrother, P. M., *The use, design, synthesis, and properties of high performance/high temperature polymers: an overview*. High Performance Polymers, 2003. 15(1): p. 3-45.
6. Korshak, V. V., et al., *Synthesis of Poly (N-phenylbenzimidazoles*. Macromolecules, 1972. 5: p. 807-12.
7. Kane, J. J., et al., *Synthesis of new nitrogen-substituted polybenzimidazoles*. Mat. Res. Soc. Symp. Proc., 1989. 134: p. 133-40.
8. Sayigh, A. R., B. W. Tucker, and H. Ulrich, *Polybenzimidazoles*, U.S. Pat. No. 3,708,439, 1973
9. Berard, N. and A. S. Hay, *Polymers from hydroxyphenylphthalazinones*. Polym. Prepr. (Am. Chem. Soc., Div. Pol. Chem.), 1993. 34(1): p. 148-9.
10. Berard, N., et al., *Polymers from 4-(4-Hydroxyphenyl)phthalazin-1-one*. Makromol. Chem., Macromol. Symp., 1994.77: p. 379-88.
11. Yoshida, S. and A. S. Hay, *Synthesis of All Aromatic Phthalazinone Containing Polymers by a Novel N—C Coupling Reaction*. Macromolecules, 1997. 30: p. 2254-61.
12. Wang, S. J., et al., *Synthesis and Characterization of Phthalazinone Containing Poly(arylene ether)s, Poly(arylene thioether)s, and Poly(arylene sulfone)s via a Novel N—C Coupling Reaction*. Macromolecules, 2004. 37(1): p. 60-65.
13. Wang, S. J., et al., *Synthesis and characterization of phthalazinone containing poly(arylene ether)s via a novel N—C coupling reaction*. J. Pol. Sci., Part A, 2003. 41: p. 2481-90.
14. Hergenrother, P. M., J. G. Smith, and J. W. Connell, *Synthesis and properties of poly(arylene ether benzimidazoles)*. Polymer, 1993. 34(4): p. 856-65.
15. Smith, J. G., Jr., J. W. Connell, and P. M. Hergenrother, *Synthesis and properties of poly[arylene ether (N-arylenebenzimidazole)s]*. J. Pol. Sci., Part A, 1993. 31(12): p. 3099-108.
16. Connell, J. W., P. M. Hergenrother, and J. G. Smith, Jr., *Synthesis of polybenzimidazoles via aromatic nucleophilic substitution*, U.S. Pat. No. 5,412,059, 1995
17. Smith, J. G., et al., *Controlled molecular weight poly(arylene ether benzimidazole)s end capped with benzimidazole and ethynyl groups*. High Perf. Polym., 1995. 7(1): p. 41-53.
18. Hergenrother, P. M., et al., *Poly(arylene ether)s containing heterocyclic units*. Adv. Pol. Sci., 1994. 117(High Performance Polymers): p. 67-110.
19. Connell, J. W., P. M. Hergenrother, and J. J. G. Smith, *Properties of poly(N-arylenebenzimidazoles) and their preparation by aromatic nucleophilic displacement*, U.S. Pat. No. 5,410,012, 1995
20. Connell, J. W., P. M. Hergenrother, and J. G. Smith, *Poly(N-Arylenebenzimidazoles) via Aromatic Nucleophilic Displacement*, U.S. Pat. No. 5,554,715, 1996
21. Connell, J. W., J. G. Smith, and P. M. Hergenrother, *Properties and potential applications of poly(arylene ether benzimidazole)s*. Pol. Mat. Sci. Eng., 1993. 70: p. 492-3.
22. Connell, J. W., J. G. Smith, and P. M. Hergenrother, *Properties and Potential Applications of Poly(arylene ether benzimidazole)s*. ACS Sympos. Series, 1995. 603: p. 186-99.
23. Smith, J. G., Jr., J. W. Connell, and P. M. Hergenrother, *Synthesis and properties of poly[arylene ether (N-arylene benzimidazoles)]*. Pol. Prep. (Am. Chem. Soc., Div. Pol. Chem.), 1992. 33(1): p. 1098-100.
24. Hergenrother, P. M., J. W. Connell, and J. G. Smith, *Chemistry and properties of poly(arylene ether benzimidazole)s*. Mat. Res. Soc. Symp. Proc., 1993. 305: p. 21-32.
25. Connell, J. W., P. M. Hergenrother, and J. G. Smith, *Properties of poly(N-arylenebenzimidazoles) and their preparation by aromatic nucleophilic displacement*, U.S. Pat. No. 5,410,012, 1995
26. Wolfe, J. P., et al., *Rational development of practical catalysts for aromatic carbon-nitrogen bond formation*. Acc. Chem. Res., 1998(31): p. 805-18.
27. Hartwig, J. F., et al., *Room-temperature palladium-catalyzed amination of aryl bromides and chlorides and extended scope of aromatic C—N bond formation with a commercial ligand*. J. Org. Chem., 1999. 64: p. 5575-5580.
28. Ley, S. V. and A. W. Thomas, *Modern Synthetic Methods for Copper-Mediated C(aryl) O, C(aryl)*. Angew. Chem. Int. Ed, 2003. 42: p. 5400-5499.
29. Cristau, H.-J., P. P. Cellier, and J.-F. Spi, *Highly Efficient and Mild Copper-Catalyzed N-and C-Arylations with Aryl Bromides and Iodides*. Chem. Eur. J., 2004. 19: p. 5607-5622.
30. Hay, A. S., *Polymers Derived from Phenolphthalein*, U.S. Pat. No. 5,237,062, 1993

31. Hay, A. S., *Polymers derived from phenolphthaleins*, U.S. Pat. No. 5,254,663, 1993

The invention claimed is:
1. A polymer or copolymer of the formula I

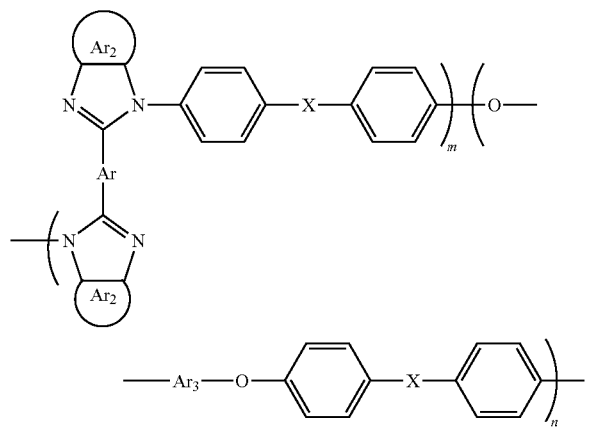

formula I wherein Ar, $Ar_2$, $Ar_3$, and X are defined as follows:
Ar is a divalent radical selected from the group consisting of:

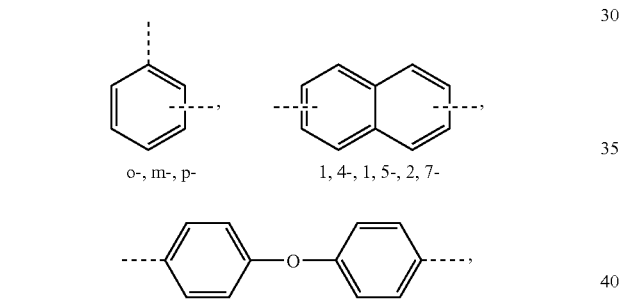

$Ar_2$ is a fused ring selected from the group consisting of:

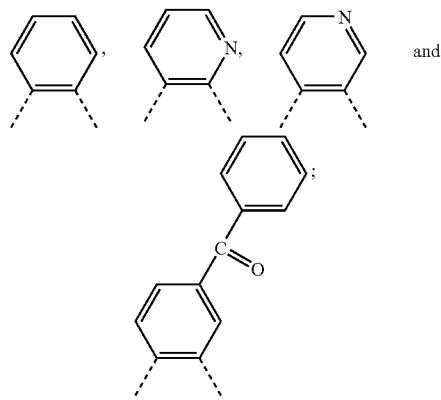

$Ar_3$ is a divalent radical selected from the group consisting of:

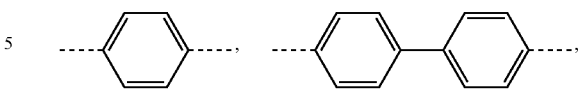

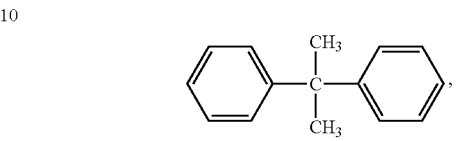

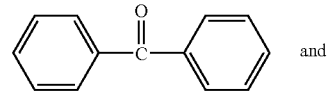

X is a divalent radical selected from the grow consisting of:

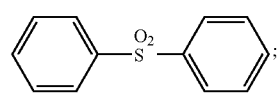

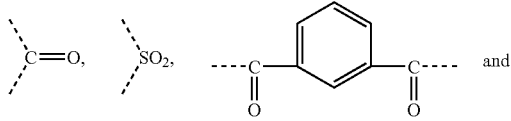

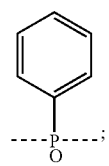

and (m+n) range from 1 to 10,000 where m is at least 1 and n is from 0 to 9999.

2. A polymer or copolymer according to claim 1, wherein X is selected from the group consisting of C(O) and $SO_2$.

3. A polymer or copolymer according to claim 1, wherein $Ar_2$ is phenylene.

4. A polymer or copolymer according to claim 2, wherein $Ar_2$ is phenylene.

5. A polymer or copolymer according to claim 1, wherein Ar is selected from 1,2-phenylene, 1,3-phenylene, 1,4-phenylene, and 2,6 pyridylene.

6. A polymer or copolymer according to claim 2, wherein Ar is selected from 1,2-phenylene, 1,3-phenylene, 1,4-phenylene, and 2,6-pyridylene.

7. A process for the preparation of a polymer of formula I

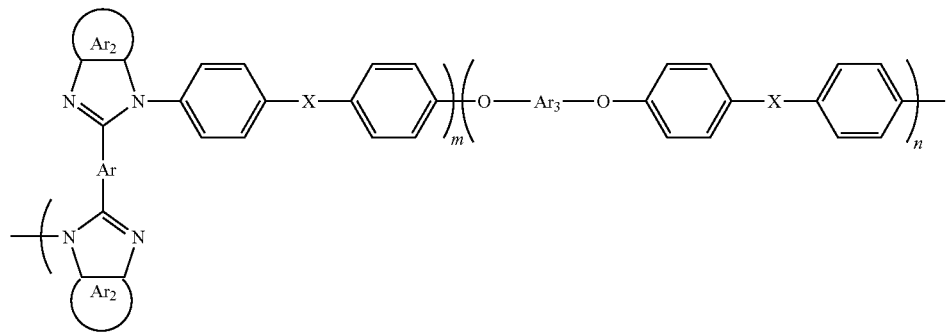

as defined in claim 1, comprising the reaction step:

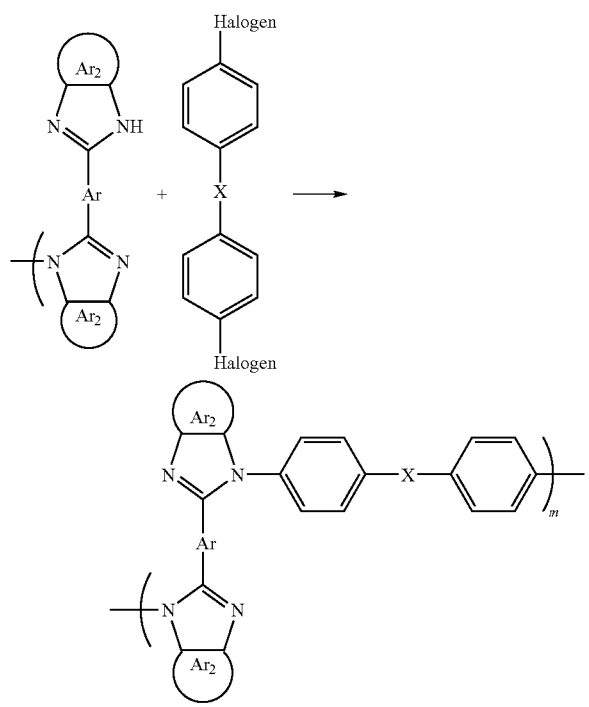

at a temperature of at least 160° C., wherein Ar, $Ar_2$ and m are as defined in claim 1, n is 0, and halogen is F or Cl.

8. The process according to claim 5, wherein the reaction step is performed at a temperature of at least about 170° C.

9. The process according to claim 5, wherein X is selected from the group consisting of C(O) and $SO_2$ and the Halogen is F.

10. The process according to claim 5, wherein the reaction step is carried out in the presence of a base in sulfolane as solvent.

11. The process according to claim 5, wherein m is an integer between 30 and 500.

12. The process according to claim 5, wherein X is selected from the group consisting of C(O) and $SO_2$ and the halogen is Cl, and the reaction step is carried out in the presence of a base in diphenyl sulfone or benzophenone as solvent, and at a temperature up to 320° C.

13. A polymer or copolymer of the formula

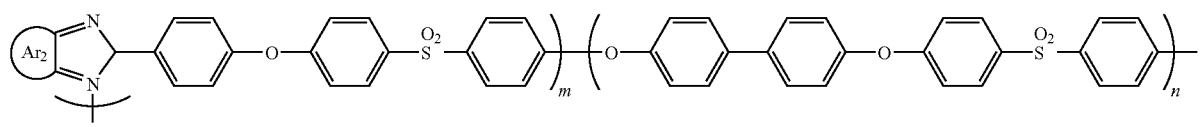

where $Ar_2$, m and n are as defined in claim 1.

14. A polymer or copolymer of claim 10, wherein m is an integer of 30 to 500.
15. A polymer or copolymer of the formula
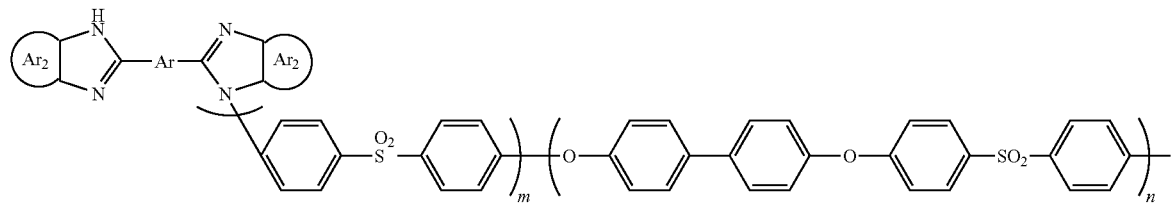
15
wherein Ar, $Ar_2$, m and n are as defined in claim 1.
16. A process for the preparation of a copolymer of formula I:
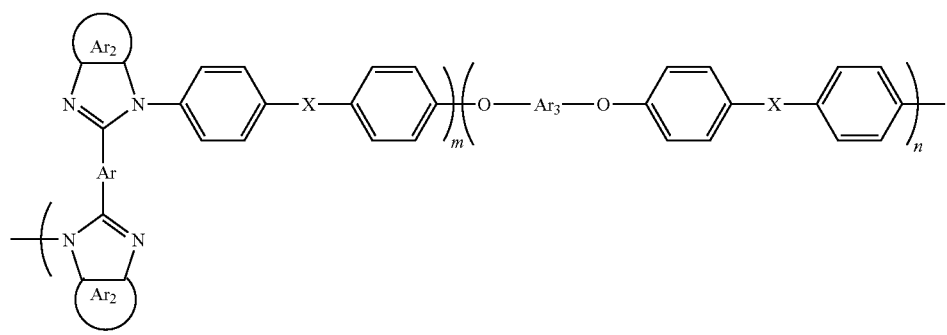
comprising the reaction step
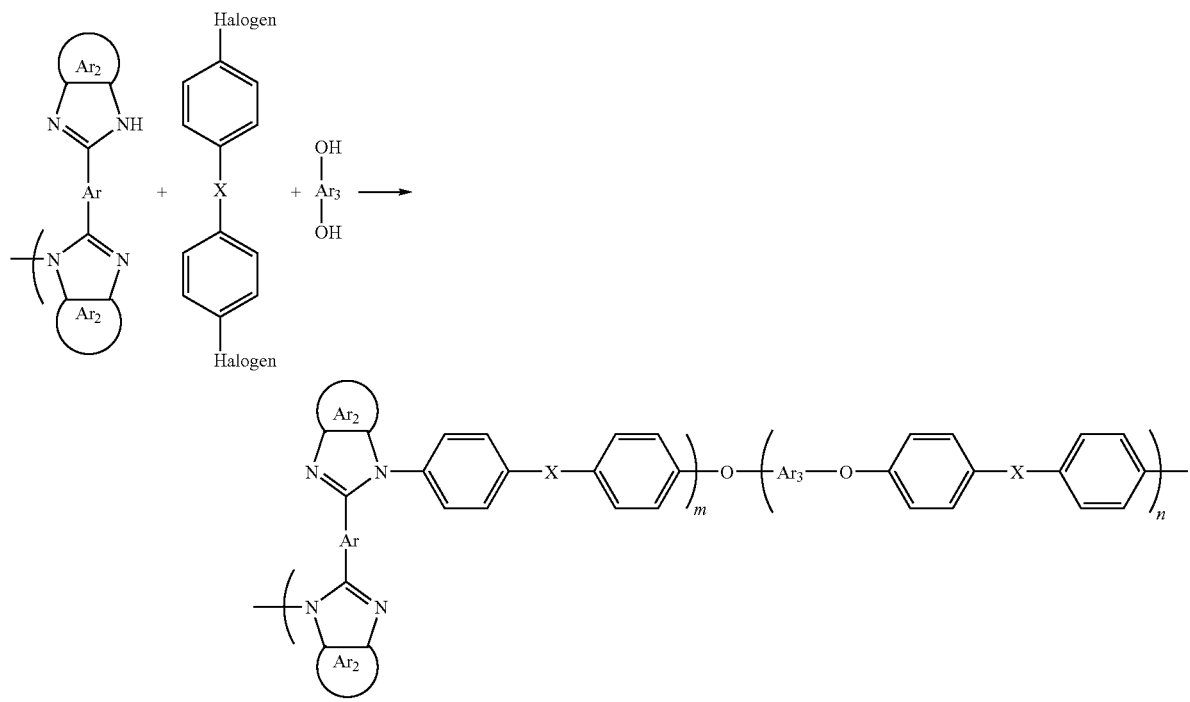

at a temperature of at least 160° C., wherein Ar, $Ar_2$, $Ar_3$ and m are as defined in claim 1, n is an integer of 1 to 9999, and Halogen is F or Cl.

17. The process according to claim 16, wherein the reaction step is performed at a temperature of at least about 170° C.

18. The process according to claim 16, wherein X is selected from the group consisting of C(O) and $SO_2$ and the Halogen is F.

19. The process according to claim 16, wherein the reaction step is carried out in the presence of a base in sulfolane as solvent.

20. The process according to claim 16, wherein X is selected from the group consisting of C(O) and $SO_2$ and the Halogen is Cl, and the reaction step is carried out in the presence of a base in diphenyl sulfone or benzophenone as solvent, and at a temperature up to 320° C.

* * * * *